(12) United States Patent
Kim

(10) Patent No.: US 11,892,044 B2
(45) Date of Patent: Feb. 6, 2024

(54) BRAKE APPARATUS FOR VEHICLE

(71) Applicant: HYUNDAI MOBIS CO., LTD., Seoul (KR)

(72) Inventor: Hyeong Sik Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 213 days.

(21) Appl. No.: 17/170,282

(22) Filed: Feb. 8, 2021

(65) Prior Publication Data

US 2021/0254679 A1    Aug. 19, 2021

(30) Foreign Application Priority Data

Feb. 19, 2020  (KR) ........................ 10-2020-0020283

(51) Int. Cl.
    *F16D 55/227*  (2006.01)
    *F16D 65/097*  (2006.01)
    *F16D 65/00*   (2006.01)
    *F16D 65/18*   (2006.01)
    *F16D 55/00*   (2006.01)

(52) U.S. Cl.
    CPC ....... *F16D 55/227* (2013.01); *F16D 65/0087* (2013.01); *F16D 65/0972* (2013.01); *F16D 65/18* (2013.01); *F16D 2055/007* (2013.01)

(58) Field of Classification Search
    CPC ............... F16D 55/227; F16D 65/0087; F16D 65/0972; F16D 65/0977; F16D 65/18; F16D 2055/0007; F16D 2055/0029; F16D 65/097
    USPC ............................................ 188/72.3, 73.45
    See application file for complete search history.

(56) References Cited

U.S. PATENT DOCUMENTS

| | | | |
|---|---|---|---|
| 6,378,665 B1* | 4/2002 | McCormick | F16D 65/0975 188/73.38 |
| 6,910,555 B2* | 6/2005 | Ciotti | F16D 65/0006 188/71.3 |
| 8,037,977 B2* | 10/2011 | Arakawa | F16D 65/0977 188/73.38 |
| 10,563,713 B2* | 2/2020 | Fricke | F16D 65/0068 |
| 10,801,565 B2* | 10/2020 | Krause | F16D 55/226 |
| 10,914,351 B2* | 2/2021 | Furukawa | F16D 65/0973 |
| 10,962,068 B2* | 3/2021 | Brandl | F16D 65/0975 |
| 11,078,975 B2* | 8/2021 | Fricke | F16D 65/16 |

(Continued)

FOREIGN PATENT DOCUMENTS

KR    10-1184575 B1    9/2012

*Primary Examiner* — Thomas W Irvin
(74) *Attorney, Agent, or Firm* — MORGAN, LEWIS & BOCKIUS LLP

(57) ABSTRACT

A brake apparatus for a vehicle may include: a pair of pin members installed in a caliper body so as to be spaced apart from each other; a first brake pad movably coupled to the pair of pin members, and contactable with a brake disk; a second brake pad coupled to the pair of pin members so as to be spaced apart from the first brake pad, and contactable with the brake disk; a pressing part installed in the caliper body, and pressing the first brake pad to bring the first and second brake pads into contact with the brake disk; and a pad liner installed on the pair of pin members, and providing an elastic restoring force to the first and second brake pads such that the first and second brake pads are restored to the original state when the pressing of the pressing part is released.

17 Claims, 23 Drawing Sheets

(56) References Cited

U.S. PATENT DOCUMENTS

| | | | |
|---|---|---|---|
| 11,125,286 B2* | 9/2021 | Fricke | F16D 65/0068 |
| 11,143,255 B2* | 10/2021 | Adkins | F16D 65/0075 |
| 11,156,256 B2* | 10/2021 | Leonard | F16D 55/227 |
| 11,401,990 B2* | 8/2022 | D'Alessio | F16D 55/228 |
| 11,415,188 B2* | 8/2022 | Barale | F16D 65/183 |
| 2003/0178261 A1* | 9/2003 | Ciotti | F16D 65/0006 |
| | | | 188/73.31 |
| 2007/0278049 A1* | 12/2007 | Kobayashi | F16D 55/228 |
| | | | 188/73.39 |
| 2008/0060888 A1* | 3/2008 | Arakawa | F16D 65/0977 |
| | | | 188/73.45 |
| 2013/0256068 A1* | 10/2013 | Hazeki | F16D 55/226 |
| | | | 188/72.4 |
| 2018/0106313 A1* | 4/2018 | Fricke | F16D 65/16 |
| 2018/0223921 A1* | 8/2018 | Krause | F16D 65/097 |
| 2019/0257377 A1* | 8/2019 | Furukawa | F16D 55/228 |
| 2019/0293133 A1* | 9/2019 | Brandl | F16D 65/0975 |
| 2021/0270335 A1* | 9/2021 | D'Alessio | F16D 65/0972 |
| 2021/0356006 A1* | 11/2021 | D'Alessio | F16D 65/0068 |
| 2022/0042562 A1* | 2/2022 | Sato | F16D 65/095 |
| 2022/0042563 A1* | 2/2022 | Sato | F16D 65/095 |
| 2022/0397172 A1* | 12/2022 | Philpott | F16D 65/0972 |
| 2023/0109487 A1* | 4/2023 | Crippa | F16D 65/0972 |
| | | | 188/73.38 |
| 2023/0204081 A1* | 6/2023 | Kim | F16D 65/092 |
| | | | 188/73.43 |

* cited by examiner

BRAKE APPARATUS FOR VEHICLE

CROSS-REFERENCE TO RELATED APPLICATION

This application claims priority from and the benefit of Korean Patent Application No. 10-2020-0020283, filed on Feb. 19, 2020, which is hereby incorporated by reference for all purposes as if set forth herein.

BACKGROUND

Field

Exemplary embodiments of the present disclosure relate to a brake apparatus for a vehicle, and more particularly, to a brake apparatus for a vehicle, which can prevent the generation of not only rattle noise but also drag torque.

Discussion of the Background

In general, a brake apparatus for braking has a brake pad which is brought into contact with a brake disk to provide a braking force, and constituted by a plurality of parts.

However, while the brake pad is brought into contact with the brake disk or spaced apart from the brake disk during a braking or releasing process, the parts may interfere with each other, thereby generating rattle noise. Furthermore, when the brake pad and the brake disk are not perfectly spaced apart from and are brought into contact with each other during the releasing process, drag torque may be generated. Therefore, there is a need for an apparatus capable of solving the problem.

The related art of the present disclosure is disclosed in Korean Patent No. 10-1184575 entitled "Electronic Disk Brake System" and registered on Sep. 14, 2012.

SUMMARY

Various embodiments are directed to a brake apparatus for a vehicle, which can prevent the generation of not only rattle noise but also drag torque.

In an embodiment, a brake apparatus for a vehicle may include: a pair of pin members installed in a caliper body so as to be spaced apart from each other; a first brake pad movably coupled to the pair of pin members, and contactable with a brake disk; a second brake pad coupled to the pair of pin members so as to be spaced apart from the first brake pad, and contactable with the brake disk; a pressing part installed in the caliper body, and configured to press the first brake pad to bring the first and second brake pads into contact with the brake disk; and a pad liner installed on the pair of pin members, and configured to provide an elastic restoring force to the first and second brake pads such that the first and second brake pads are restored to the original state when the pressing of the pressing part is released.

The pad liner may apply a load to the first and second brake pads.

The pad liner may include: a pad liner body disposed between the pair of pin members; a pair of pad liner support parts protruding from both ends of the pad liner body, respectively, and configured to support the pair of pin members, respectively; a pair of pad liner mounting parts bent and extended from the both ends of the pad liner body so as to cover the pair of pin members, respectively, and mounted on the pair of pin members, respectively; a pair of pad liner extension parts extended from the pad liner body to the opposite side of the pad liner body; and a pair of pad liner return parts connected to the pair of pad liner extension parts, respectively, and contacted with the first and second brake pads so as to provide an elastic restoring force to the first and second brake pads, respectively.

The pad liner return part may include: a pad liner return part body connected to the pad liner extension part; a first pad liner return extension part extended from the pad liner return part body so as to be tilted toward the first brake pad, and contacted with the first brake pad; and a second pad liner return extension part extended from the pad liner return part body so as to be tilted toward the second brake pad, and contacted with the second brake pad.

The first pad liner return extension part may include: a first pad liner return extension part body extended from the pad liner return part body so as to be tilted toward the first brake pad; and a first pad liner return contact part extended from the first pad liner return extension part body and tilted toward the first brake pad so as to form a predetermined angle with the first pad liner return extension part body, and contacted with the first brake pad.

The second pad liner return extension part may include: a second pad liner return extension part body extended from the pad liner return part body so as to be tilted toward the second brake pad; and a second pad liner return contact part extended from the second pad liner return extension part body and tilted toward the second brake pad so as to form a predetermined angle with the second pad liner return extension part body, and contacted with the second brake pad.

The first pad liner return contact part may include a first contact part which is formed by bending an end portion of the first pad liner return contact part in a direction facing the second pad liner return contact part, and has a round portion contacted with the first brake pad, and the second pad liner return contact part may include a second contact part which is formed by bending an end portion of the second pad liner return contact part in a direction facing the first pad liner return contact part, and has a round portion contacted with the second brake pad.

The first brake pad may have a plurality of first groove parts formed therein, such that the first pad liner return extension part is inserted into the corresponding first groove part and contacted with the first groove part, and the second brake pad may have a plurality of second groove parts formed therein, such that the second pad liner return extension part is inserted into the corresponding second groove part and contacted with the second groove part.

The first groove part may include a first contact groove which is contacted with the first pad liner return extension part, and formed in a tilted shape whose width increases from the inside to the outside, and the second groove part may include a second contact groove which is contacted with the second pad liner return extension part, and formed in a tilted shape whose width increases from the inside to the outside.

The pad liner may include: a pad liner body disposed between the pair of pin members; a first pad liner return part extended from the pad liner body so as to be tilted toward the first brake pad, and contacted with the first brake pad; a second pad liner return part extended from the pad liner body so as to be tilted toward the second brake pad, and contacted with the second brake pad; a pair of pad liner extension parts extended from one end of the pad liner body to the opposite side of the first pad liner return part, and extended from the other end of the pad liner body to the opposite side of the second pad liner return part; a pair of pad liner support parts extended from the pair of pad liner extension parts so s to be bent toward the pair of pin members, respectively, and configured to support the pair of pin members, respectively; and a pair of pad liner protrusion parts protruding from the pair of pad liner extension parts toward the pair of pin members, respectively, and disposed to face the pair of pin members, respectively.

The first brake pad may include: a first back plate movably coupled to the pair of pin members, and disposed on one side of the brake disk, such that the pressing part is contactable with the first back plate; and a pair of first friction members coupled to the first back plate so as to be spaced apart from each other, and contacted with the brake disk, wherein the first back plate has a first space formed between the pair of first friction members, such that the first pad liner return part is contacted with the first space.

The first pad liner return part may include: a first pad liner return extension part body extended from the pad liner body so as to be tilted toward the first brake pad; and a first pad liner return contact part extended from the first pad liner return extension part body and tilted toward the first brake pad so as to form a predetermined angle with the first pad liner return extension part body, and contacted with the first space.

The second brake pad may include: a second back plate coupled to the pair of pin members so as to be spaced apart from the first brake pad, and disposed on the other side of the brake disk; and a pair of second friction members coupled to the second back plate so as to be spaced apart from each other, and contacted with the brake disk, wherein the second back plate has a second space formed between the pair of second friction members, such that the second pad liner return part is contacted with the second space.

The second pad liner return part may include: a second pad liner return extension part body extended from the pad liner body so as to be tilted toward the second brake pad; and a second pad liner return contact part extended from the second pad liner return extension part body and tilted toward the second brake pad so as to form a predetermined angle with the second brake pad, and contacted with the second space.

The first pad liner return part may have a rounded portion contacted with the first space, and the second pad liner return part may have a rounded portion contacted with the second space part.

The first pad liner return contact part may include a first contact part which is formed by bending an end portion of the first pad liner return contact part in a direction facing the second pad liner return contact part, and has a round portion contacted with the first brake pad, and the second pad liner return contact part may include a second contact part which is formed by bending an end portion of the second pad liner return contact part in a direction facing the first pad liner return contact part, and has a round portion contacted with the second brake pad.

The first space may have a first groove part formed therein, such that the first pad liner return part is inserted into the first groove part, and contacted with the first groove part, and the second space may have a second groove part formed therein, such that the second pad liner return part is inserted into the second groove part, and contacted with the second groove part.

The first groove part may include a first contact groove which is contacted with the first pad liner return part, and formed in a tilted shape whose width increases from the inside to the outside, and the second groove part may include a second contact groove which is contacted with the second pad liner return part, and formed in a tilted shape whose width increases from the inside to the outside.

In the brake apparatus for a vehicle in accordance with the embodiment of the present disclosure, the first and second brake pads may be perfectly spaced apart from the brake disk through the pad liner which is installed on the pair of pin members, and provides an elastic restoring force to the first and second brake pads so as to restore the first and second brake pads to the original state, when the pressing of the pressing part is released, thereby preventing the generation of drag torque.

Furthermore, the pad liner may apply a load by pressing the brake pad at the regular position during a braking or releasing process, thereby preventing rattle noise.

DETAILED DESCRIPTION OF THE ILLUSTRATED EMBODIMENTS

Hereinafter, a brake apparatus for a vehicle will be described below with reference to the accompanying drawings through various exemplary embodiments.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
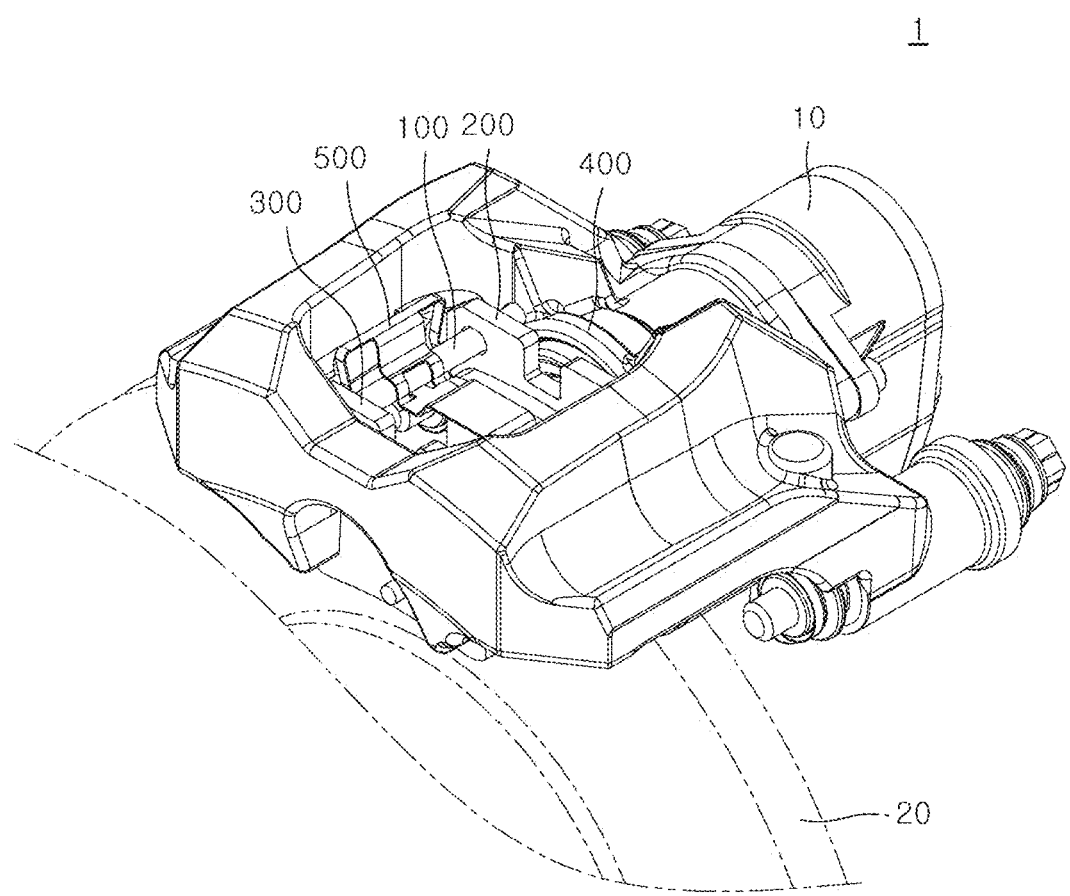
FIG. 1 is a diagram schematically illustrating a brake apparatus for a vehicle in accordance with a first embodiment of the present disclosure.
Figure 2:
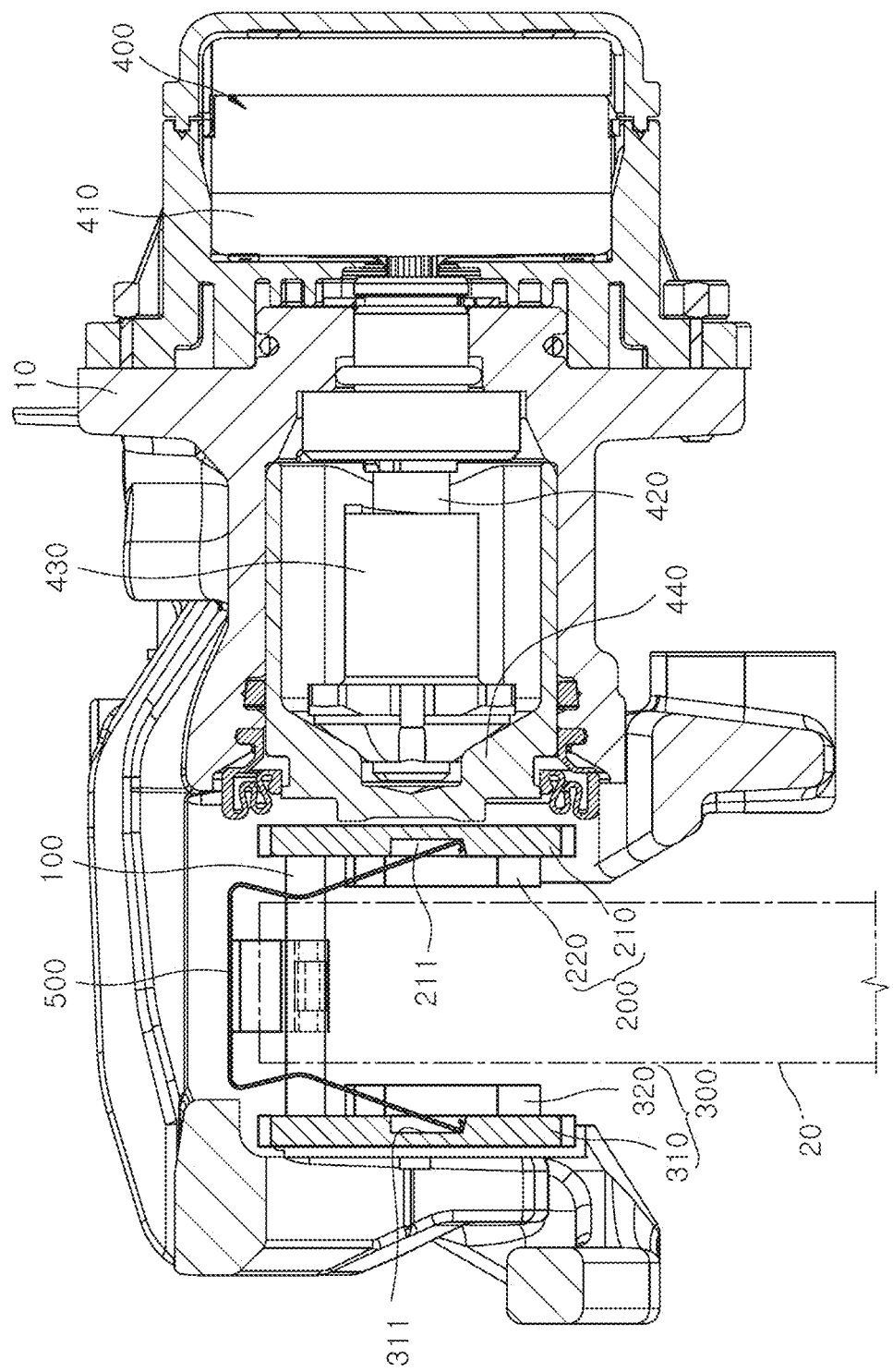
FIG. 2 is a cross-sectional view of the brake apparatus for a vehicle in accordance with the first embodiment of the present disclosure.
Figure 3:
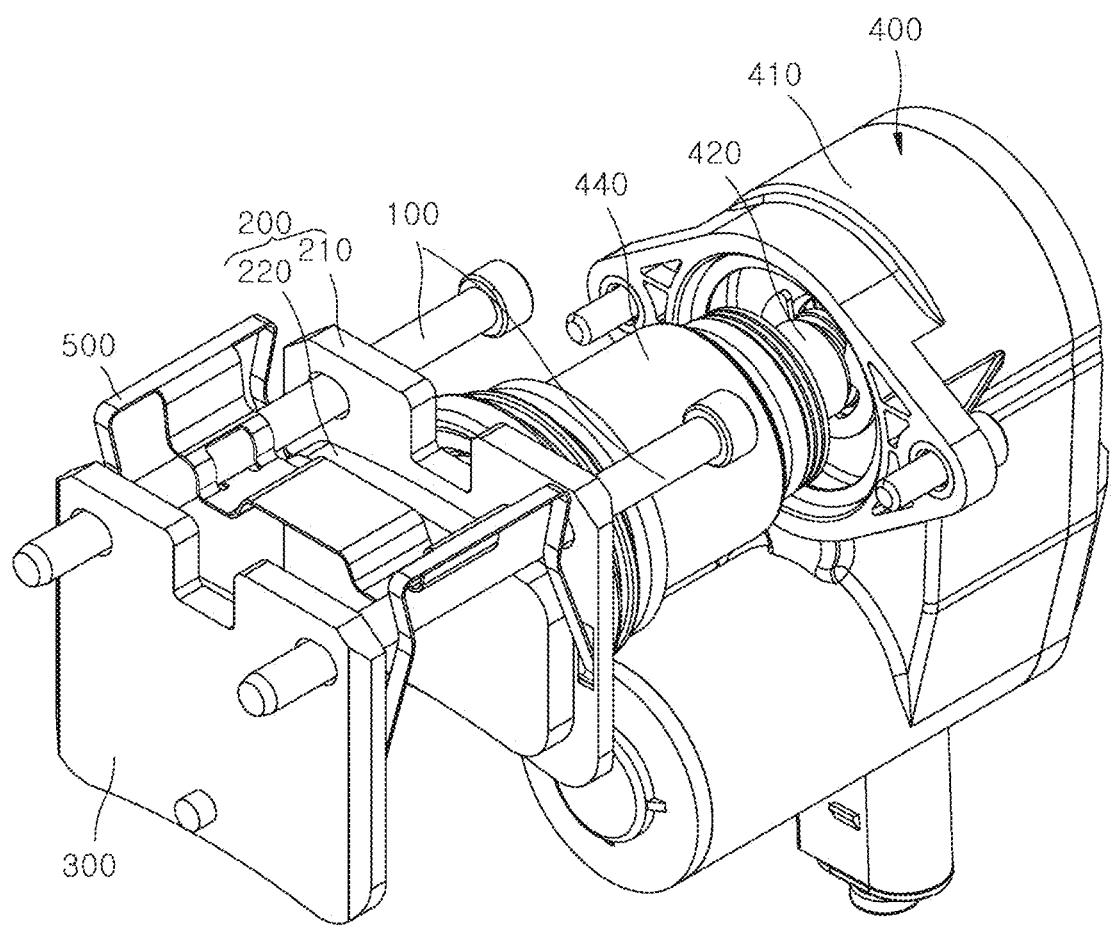
FIG. 3 is a perspective view of main parts of the brake apparatus for a vehicle in accordance with the first embodiment of the present disclosure.
Figure 4:
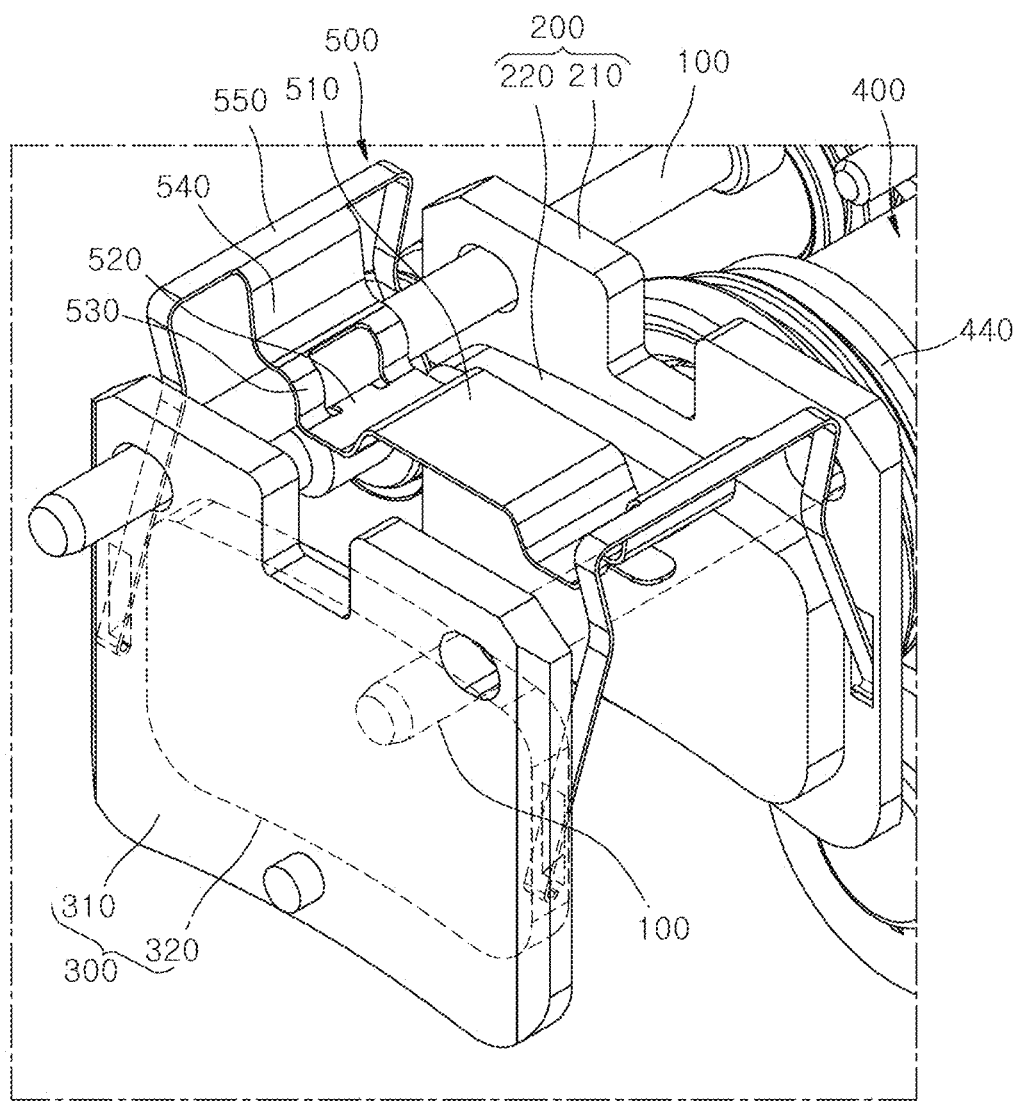
FIG. 4 is an expanded view of the main parts of FIG. 3.
Figure 5:
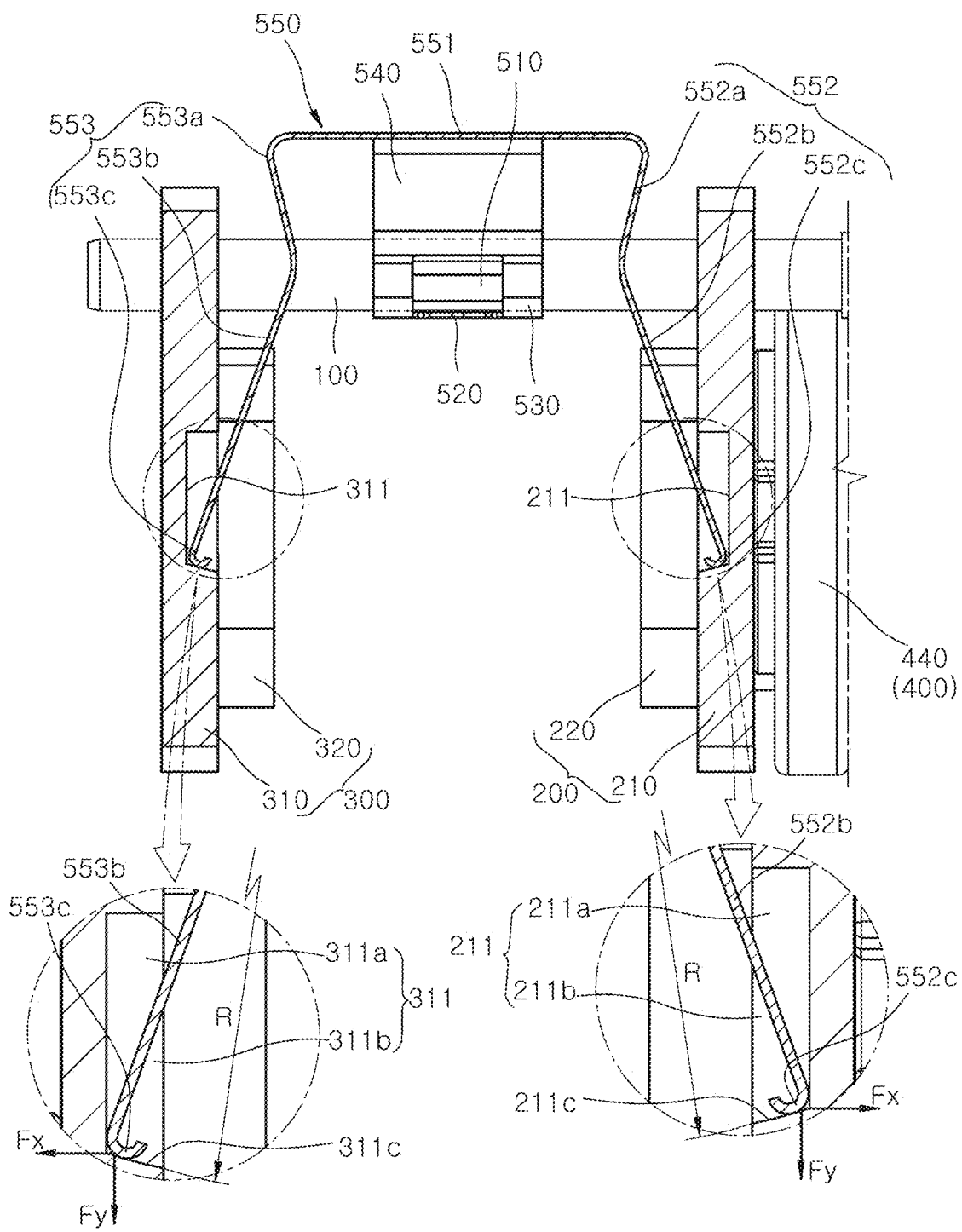
FIG. 5 is a cross-sectional view of the main parts of FIG. 3.
Figure 6:
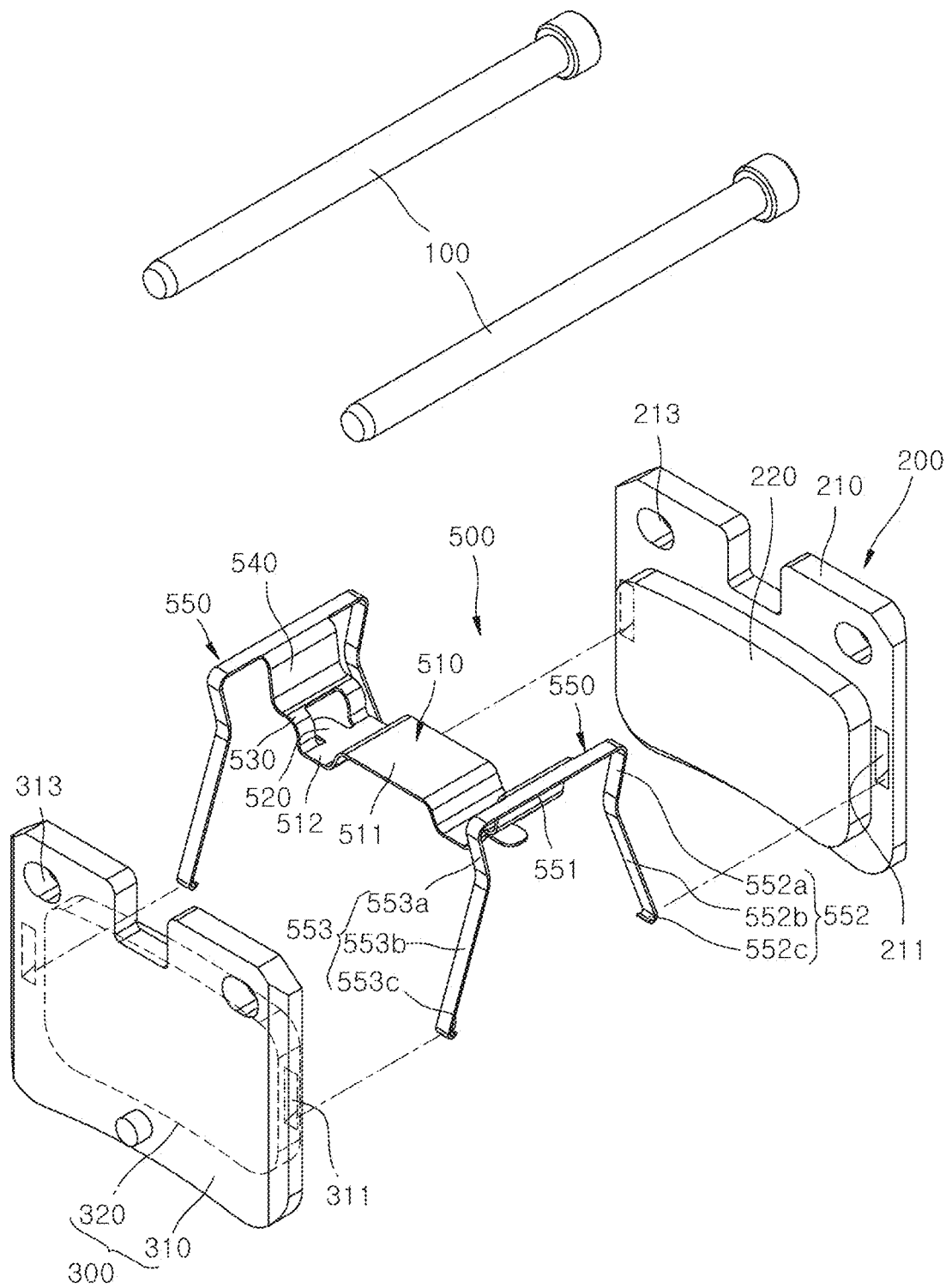
FIG. 6 is an exploded perspective view of the main parts of FIG. 3.
Figure 7:
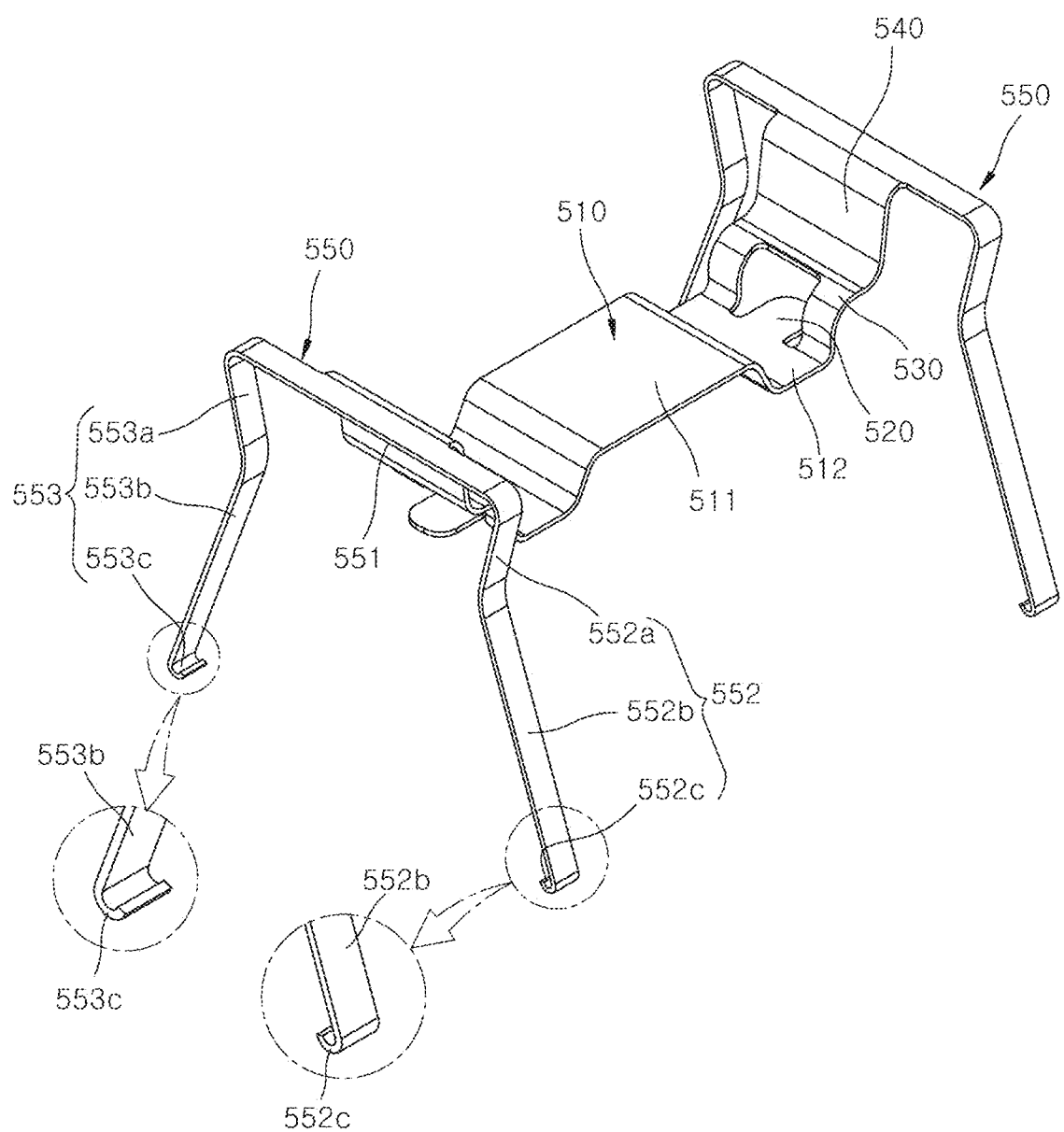
FIG. 7 is a perspective view of a pad liner of the brake apparatus for a vehicle in accordance with the first embodiment of the present disclosure.
Figure 8:
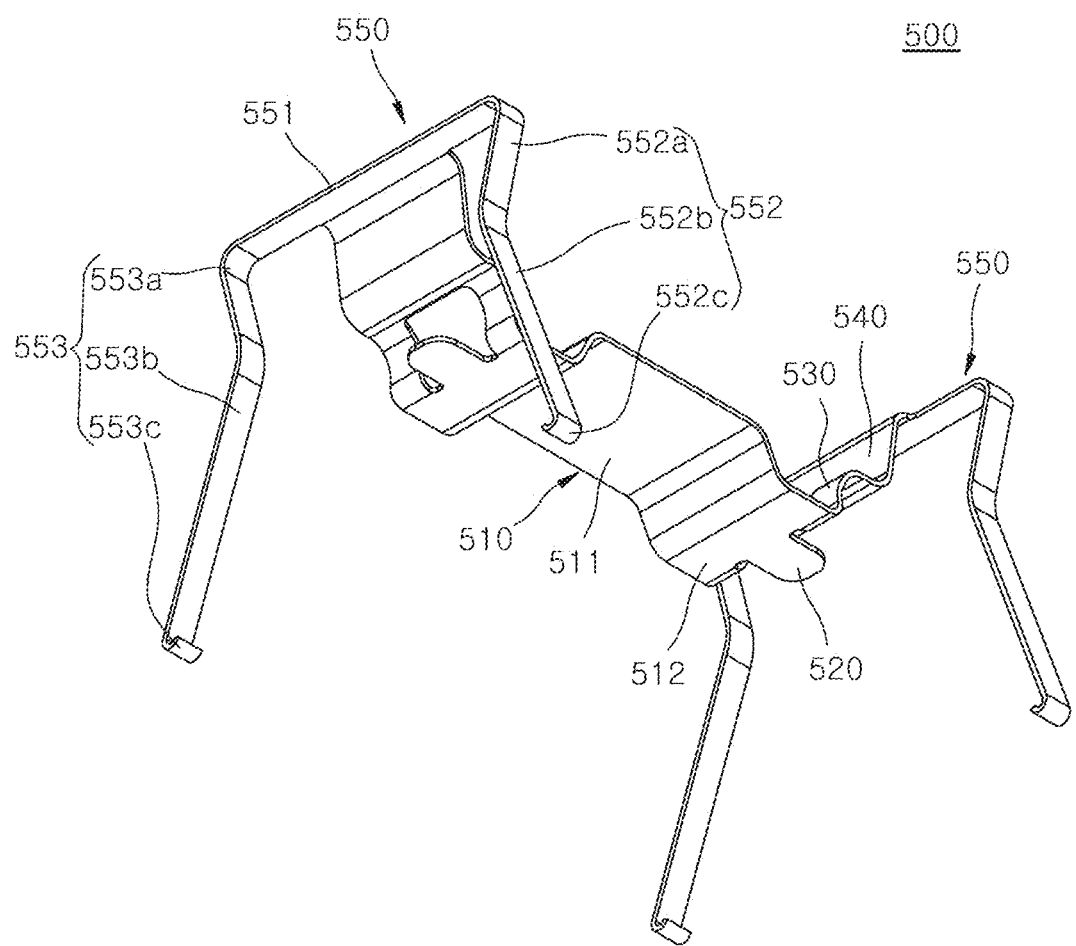
FIG. 8 is a perspective view of the pad liner of the brake apparatus for a vehicle in accordance with the first embodiment of the present disclosure, when seen from a different direction.
Figure 9:
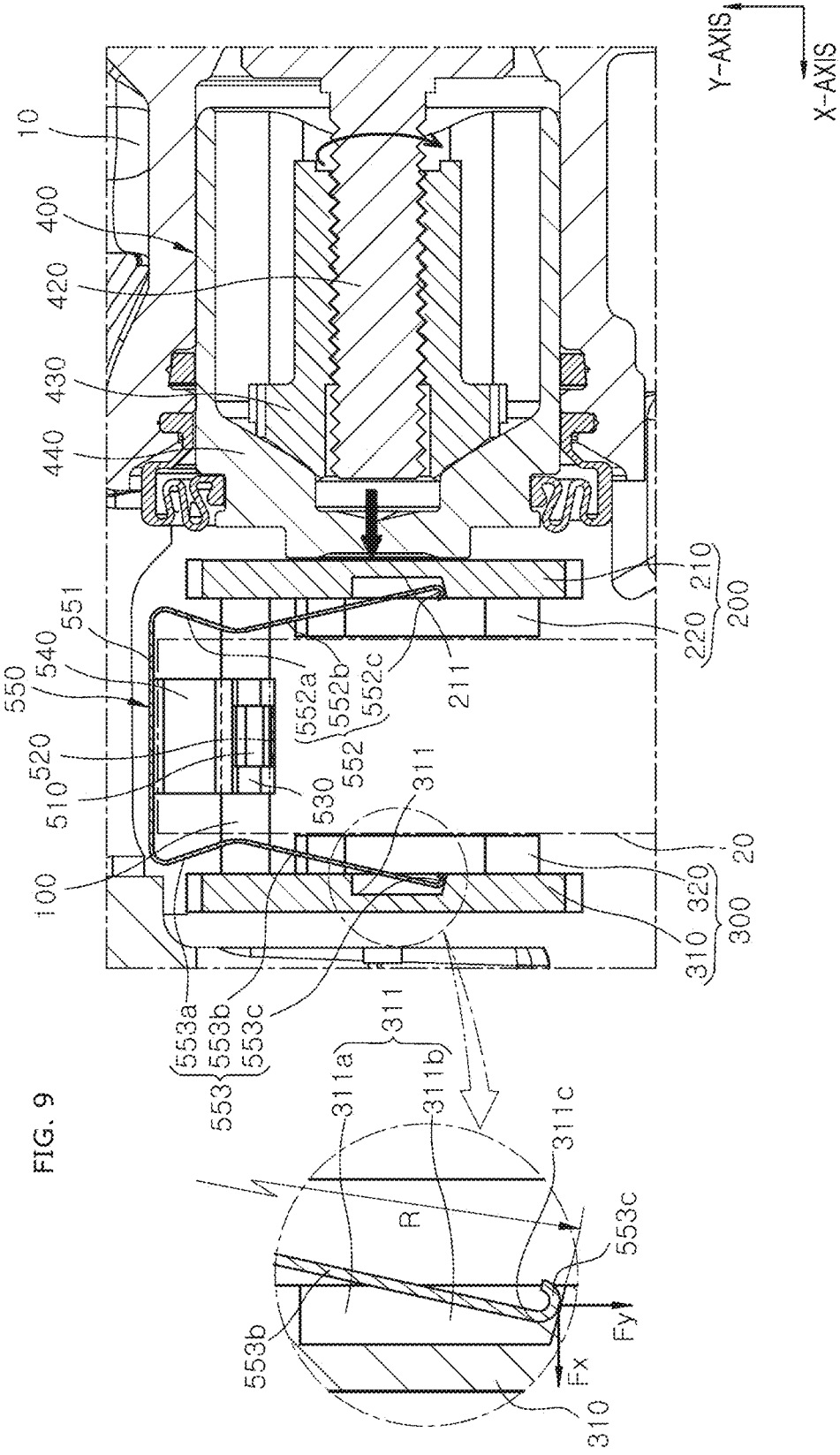
FIGS. 9 and 10 are diagrams illustrating an operation of the brake apparatus for a vehicle in accordance with the first embodiment of the present disclosure.
Figure 10:
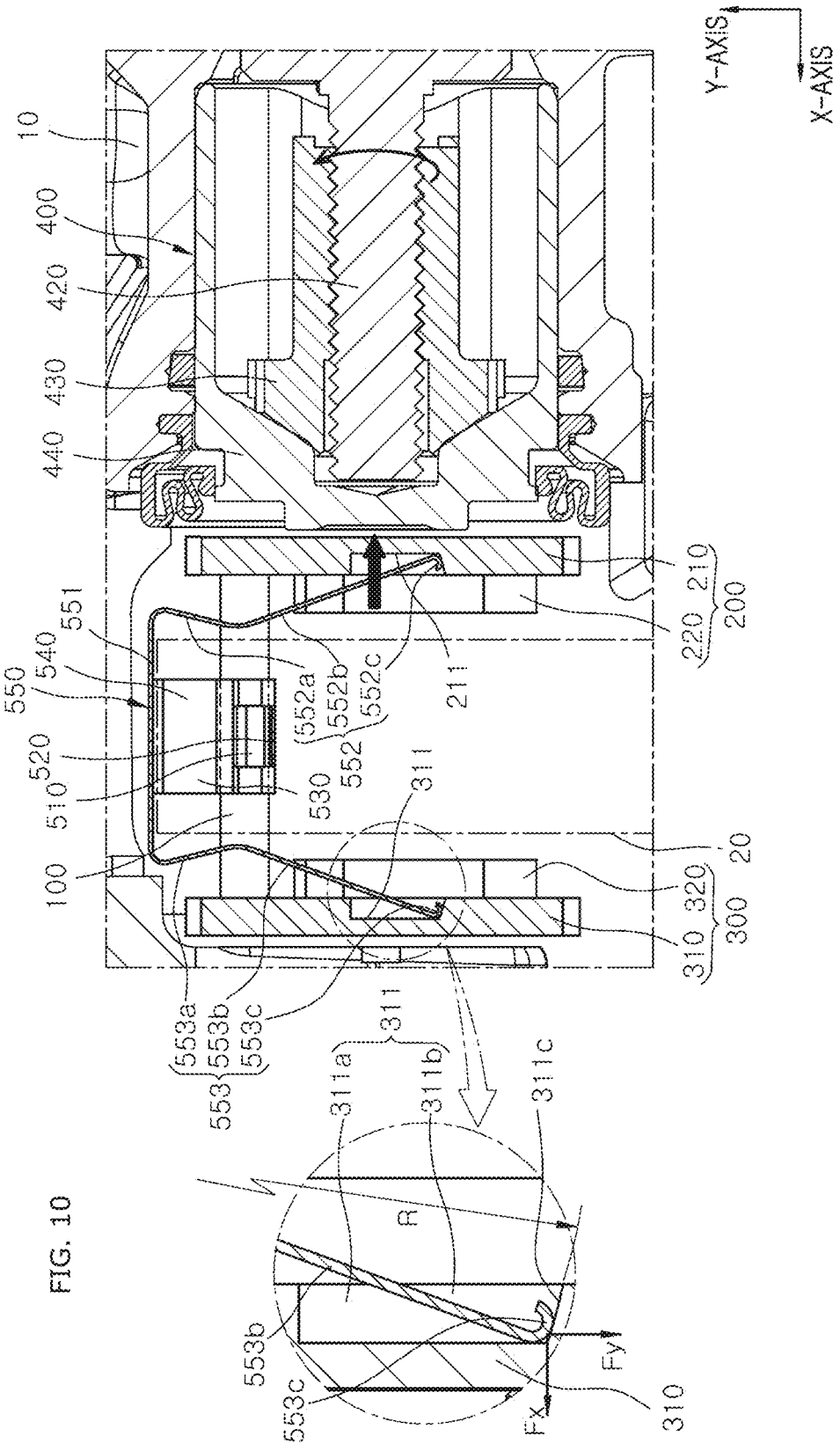

FIG. 1 is a diagram schematically illustrating a brake apparatus for a vehicle in accordance with a first embodiment of the present disclosure, FIG. 2 is a cross-sectional view of the brake apparatus for a vehicle in accordance with the first embodiment of the present disclosure, FIG. 3 is a perspective view of main parts of the brake apparatus for a vehicle in accordance with the first embodiment of the present disclosure, FIG. 4 is an expanded view of the main parts of FIG. 3, FIG. 5 is a cross-sectional view of the main parts of FIG. 3, FIG. 6 is an exploded perspective view of the main parts of FIG. 3, FIG. 7 is a perspective view of a pad liner of the brake apparatus for a vehicle in accordance with the first embodiment of the present disclosure, FIG. 8 is a perspective view of the pad liner of the brake apparatus for a vehicle in accordance with the first embodiment of the present disclosure, when seen from a different direction, and FIGS. 9 and 10 are diagrams illustrating an operation of the brake apparatus for a vehicle in accordance with the first embodiment of the present disclosure.

Referring to FIGS. 1 to 10, a brake apparatus 1 for a vehicle in accordance with the first embodiment of the present disclosure includes a pair of pin members 100, a first brake pad 200, a second brake pad 300, a pressing part 400 and a pad liner 500.

The pair of pin members 100 are installed in a caliper body 10 so as to be spaced apart from each other. The caliper body 10 has a hole-shaped installation part (not illustrated) formed in the center thereof in a top-to-bottom direction (based on FIG. 1), and the pair of pin members 100 are installed in the installation part so as to be spaced apart from each other.

The first brake pad 200 is movably coupled to the pair of pin members 100, and is contactable with a brake disk 20. The first brake pad 200 includes a first back plate 210 and a first friction member 220. The first back plate 210 is movably coupled to the pair of pin members 100, and disposed on one side of the brake disk 20. Specifically, the first back plate 210 has a pair of first through-holes 213 through which the pair of pin members 100 pass. Through the pair of first through-holes 213, the first brake pad 200 may be easily coupled to the pair of pin members 100, and moved along the pair of pin members 100.

The first friction member 220 is coupled to the first back plate 210, and contacted with the brake disk 20. The first friction member 220 may be made of an elastic material, and is contacted with one side of the brake disk 20. The first friction member 220 is coupled to the first back plate 210 so as to face the one side of the brake disk 20.

The second brake pad 300 is movably coupled to the pair of pin members 100 so as to be spaced from the first brake pad 200, and is contactable with the brake disk 20. The second brake pad 300 includes a second back plate 310 and a second friction member 320. The second back plate 310 is coupled to the pair of pin members 100, and disposed on the other side of the brake disk 20. At this time, the second back plate 310 may be movable on the pair of pin members 100. Specifically, the second back plate 310 has a pair of second through-holes 313 through which the pair of pin members 100 pass. Through the pair of second through-holes 313, the second brake pad 300 may be easily coupled to the pair of pin members 100, and moved along the pair of pin members 100.

The second friction member 320 is coupled to the second back plate 310, and contacted with the brake disk 20. The second friction member 320 may be made of an elastic material, and is contacted with the other side of the brake disk 20. The second friction member 320 is coupled to the second back plate 310 so as to face the other side of the brake disk 20.

The pressing part 400 is installed in the caliper body 10, and presses the first brake pad 200 to bring the first and second brake pads 200 and 300 into contact with the brake disk 20. The pressing part 400 includes a motor module 410, a screw bar 420, a nut 430 and a piston 440. The screw bar 420 is installed in the caliper body 10, and rotated by power received from the motor module 410. The motor module 410 includes a motor and a plurality of gears, which are not illustrated. Any one of the gears is connected to the motor, and another one of the gears is connected to the screw bar 420. The gears receive a rotational force from the motor, and rotate the screw bar 420. At this time, the screw bar 420 is formed in a rod shape and inserted into the nut 430. The screw bar 420 has a male screw thread (not illustrated) formed on the outside thereof, and is rotated by the rotational force received from the motor.

The nut 430 covers the outside of the screw bar 420, and is engaged and coupled with the screw bar 420, and moved toward the brake disk 20 by the rotation of the screw bar 420. The nut 430 has a female screw thread (not illustrated) formed therein, the female screw thread being engaged and coupled with the male screw thread of the screw bar 420. Specifically, when the screw bar 420 is rotated in a predetermined direction, the nut 430 is moved toward the brake disk 20, while converting the rotational motion of the screw bar 420 into a linear motion. On the contrary, when the screw bar 420 is rotated in the opposite direction of the predetermined direction, the nut 430 is moved to the opposite side of the brake disk 20.

The piston 440 covers the outside of the nut 430, and is moved with the nut 430. The piston 440 has a shape to cover the outside of the nut 430, and is moved toward the brake disk 20 or the opposite side of the brake disk 20 with the nut 430 on a cylinder (not illustrated) of the caliper body 10.

The first brake pad 200 is contacted with the piston 440, and moved with the piston 440 so as to press the brake disk 20. The first brake pad 200 is moved toward the brake disk 20 with the nut 430 and the piston 440, and presses the brake disk 20. On the contrary, the first brake pad 200 is moved to the opposite side of the brake disk 20 with the nut 430 and the piston 440, and releases the pressed brake disk 20.

The pad liner 500 is installed on the pair of pin members 100, and provides an elastic restoring force to the first and second brake pads 200 and 300, thereby restoring the first and second brake pads 200 and 300 to the original state when the pressing of the pressing part 400 is released.

When the screw bar 420 is rotated in the predetermined direction, the nut 430, the piston 440 and the first brake pad 200 may be moved toward the brake disk 20 at the same time, and the first and second brake pads 200 and 300 may be brought into contact with the brake disk 20 to generate a braking force. At this time, the pad liner 500 is disposed between the first and second brake pads 200 and 300, and elastically deformed.

Then, when the screw bar 420 is rotated in the opposite direction of the predetermined direction, the nut 430, the piston 440 and the first brake pad 200 may be moved to the opposite side of the brake disk 20, and the first and second brake pads 200 and 300 may be spaced apart from the brake disk 20 such that the braking force is removed. At this time, the pad liner 500 may provide an elastic restoring force to the first and second brake pads 200 and 300, such that the first and second brake pads 200 and 300 are perfectly spaced apart from the brake disk 20. Thus, it is possible to prevent the generation of drag torque (see FIGS. 9 and 10). Furthermore, the pad liner 500 may be restricted from moving in the top-to-bottom direction, which makes it possible to prevent the generation of rattle noise.

The pad liner 500 applies a load to the first and second brake pads 200 and 300. Even during a braking/releasing process, the pad liner 500 may apply a load by pressing the first and second brake pads 200 and 300 at a position when the pad liner 500 is assembled, i.e. a regular position. That is, during the braking/releasing process, it is possible to prevent rattle noise which may be generated while the pad liner 500 interferes with the first and second brake pads 200 and 300 due to vibration or the like.

The pad liner 500 includes a pad liner body 510, a pair of pad liner support parts 520, a pair of pad liner mounting parts 530, a pair of pad liner extension parts 540 and a pair of pad liner return parts 550 (see FIGS. 4 to 8).

The pad liner body 510 is disposed between the pair of pin members 100. The pad liner body 510 includes a first pad liner body 511 and a second pad liner body 512. The first pad liner body 511 is disposed between the pair of pin members 100 so as to be elongated in a direction crossing the pair of pin members 100. The second pad liner body 512 is formed by bending a portion of the first pad liner body 511 from either end of the first pad liner body 511 toward the bottom (based on FIG. 7).

The pair of pad liner support parts 520 may protrude from both ends of the pad liner body 510, respectively, and support the pair of pin members 100, respectively. Specifically, the pair of pad liner support parts 520 may protrude from both ends of the second pad liner body 512 toward the pair of pin members 100, respectively, and support the bottoms of the pair of pin members 100 (based on FIGS. 4 to 8), respectively. The pad liner 500 may be restricted from moving downward on the pair of pin members 100, which makes it possible to effectively prevent rattle noise.

The pair of pad liner mounting parts 530 are bent and extended from both ends of the pad liner body 510 so as to cover the pair of the pin members 100, respectively, and mounted on the pair of pin members 100, respectively. The pair of pad liner mounting parts 530 are extended from both ends of the second pad liner body 512 so as to cover the tops of the pin members 100 (based on FIGS. 4 to 8), respectively, and mounted on the pair of pin members 100, respectively. Thus, the pad liner 500 may be not only stably coupled to the pair of pin members 100, but also restricted from moving upward on the pair of pin members 100, thereby effectively prevent rattle noise.

The pair of pad liner return parts 550 are connected to the pair of pad liner extension parts 540, respectively, and brought into contact with the first and second brake pads 200 and 300 so as to provide an elastic restoring force to the first and second brake pads 200 and 300, respectively.

The pad liner return part 550 includes a pad liner return part body 551, a first pad liner return extension part 552 and a second pad liner return extension part 553. The pad liner return part body 551 is connected to the pad liner extension part 540. The pad liner return part body 551 is formed in a plate shape, and connected to the pad liner extension part 540 so as to be horizontally disposed at an end of the pad liner extension part 540.

The first pad liner return extension part 552 is extended from the pad liner return part body 551 so as to be tilted toward the first brake pad 200, and contacted with the first brake pad 200. The first pad liner return extension part 552 is elastically deformed by the first brake pad 200 which is moved toward the brake disk 20 through the pressing part 400 during the braking process, and provides an elastic restoring force to the first brake pad 200 during the releasing process.

The second pad liner return extension part 553 is extended from the pad liner return part body 551 so as to be tilted toward the second brake pad 300, and contacted with the second brake pad 300. The second pad liner return extension part 553 is elastically deformed between the first and second brake pads 200 and 300 during the braking process, and provides an elastic restoring force to the second brake pad 300 during the releasing process.

The first pad liner return extension part 552 includes a first pad liner return extension part body 552a and a first pad liner return contact part 552b. The first pad liner return extension part body 552a is extended from the pad liner return part body 551 so as to be tilted toward the first brake pad 200.

The first pad liner return contact part 552b is extended from the first pad liner return extension part body 552a and tilted toward the first brake pad 200 so as to form a predetermined angle with the first pad liner return extension part body 552a, and contacted with the first brake pad 200. Thus, it is possible to prevent plastic deformation in the first pad liner return extension part 552, when the first pad liner return extension part 552 is elastically deformed during the braking process.

The second pad liner return extension part 553 includes a second pad liner return extension part body 553a and a second pad liner return contact part 553b. The second pad liner return extension part body 553a is extended from the pad liner return part body 551 so as to be tilted toward the second brake pad 300.

The second pad liner return contact part 553b is extended from the second pad liner return extension part body 553a and tilted toward the second brake pad 300 so as to form a predetermined angle with the second pad liner return extension part body 553a, and contacted with the second brake pad 300. Thus, it is possible to prevent plastic deformation in the second pad liner return extension part 553, when the second pad liner return extension part 553 is elastically deformed during the braking process.

The first pad liner return contact part 552b includes a first contact part 552c. The first contact part 552c is formed by bending an end portion of the first pad liner return contact part 552b in a direction facing the second pad liner return contact part 553b, and thus has a round portion contacted with the first brake pad 200. Therefore, it is possible to reduce damage to the first brake pad 200 due to the contact between the first pad liner return extension part 552 and the first brake pad 200.

The second pad liner return contact part 553b includes a second contact part 553c. The second contact part 553c is formed by bending an end portion of the second pad liner return contact part 553b in a direction facing the first pad liner return contact part 552b, and thus has a round portion contacted with the second brake pad 300. Therefore, it is possible to reduce damage to the second brake pad 300 due to the contact between the second pad liner return extension part 553 and the second brake pad 300.

The first brake pad 200 has a plurality of first groove parts 211 formed therein, such that the first pad liner return extension part 552 is inserted into the corresponding first groove part 211 so as to be contacted with the first groove part 211. The first groove part 211 has a first contact groove 211b which is contacted with the first pad liner return extension part 552, and formed in a tilted shape whose width increases from the inside toward the outside. Specifically, the first groove part 211 includes a first groove body 211a and the first contact groove 211b. The first groove body 211a, into which the first pad liner return extension part 552 is inserted, has a constant width. The first contact groove 211b is connected to the first groove body 211a, formed in a shape whose width increases toward the outside, and contacted with the first pad liner return extension part 552. The first contact groove 211b has a first contact surface 211c which is contacted with the first pad liner return extension part 552 and tilted from top to bottom (based on FIG. 5).

Thus, during the braking/releasing process, the first pad liner return extension part 552 may be easily moved toward the brake disk 20 or to the opposite side of the brake disk 20, while pressing the first contact surface 211c and forming a curve along the first contact surface 211c. Furthermore, during the braking/release process, a force R may be applied in a direction Fx and a direction Fy in the first groove part 211 by the first pad liner return extension part 552, and the magnitude of the force applied in the direction Fy may be constantly maintained. Thus, it is possible to further prevent the generation of rattle noise due to the interference between the first pad liner return extension part 552 and the first brake pad 200.

The second brake pad 300 has a plurality of second groove parts 311 formed therein, such that the second pad liner return extension part 553 is inserted into the corresponding second groove part 311 and contacted with the second groove part 311. The second groove part 311 has a second contact groove 311b which is contacted with the second pad liner return extension part 553, and formed in a tilted shape whose width increases from the inside to the outside. Specifically, the second groove part 311 includes a second groove body 311a and the second contact groove 311b. The second groove body 311a, into which the second pad liner return extension part 553 is inserted, has a constant width. The second contact groove 311b is connected to the second groove body 311a, formed in a shape whose width increases toward the outside, and contacted with the second pad liner return extension part 553. The second contact groove 311b has a second contact surface 311c which is contacted with the second pad liner return extension part 553 and tilted from top to bottom (based on FIG. 5).

Thus, during the braking/releasing process, the second pad liner return extension part 553 may be easily moved toward the brake disk 20 or to the opposite side of the brake disk 20, while pressing the second contact surface 311c and forming a curve along the second contact surface 311c. Furthermore, during the braking/release process, a force R may be applied in the direction Fx and the direction Fy in the second groove part 311 by the second pad liner return extension part 553, and the magnitude of the force applied in the direction Fy may be constantly maintained. Thus, it is possible to further prevent the generation of rattle noise due to interference between the second pad liner return extension part 553 and the second brake pad 300 (see FIGS. 9 and 10).

Figure 11:
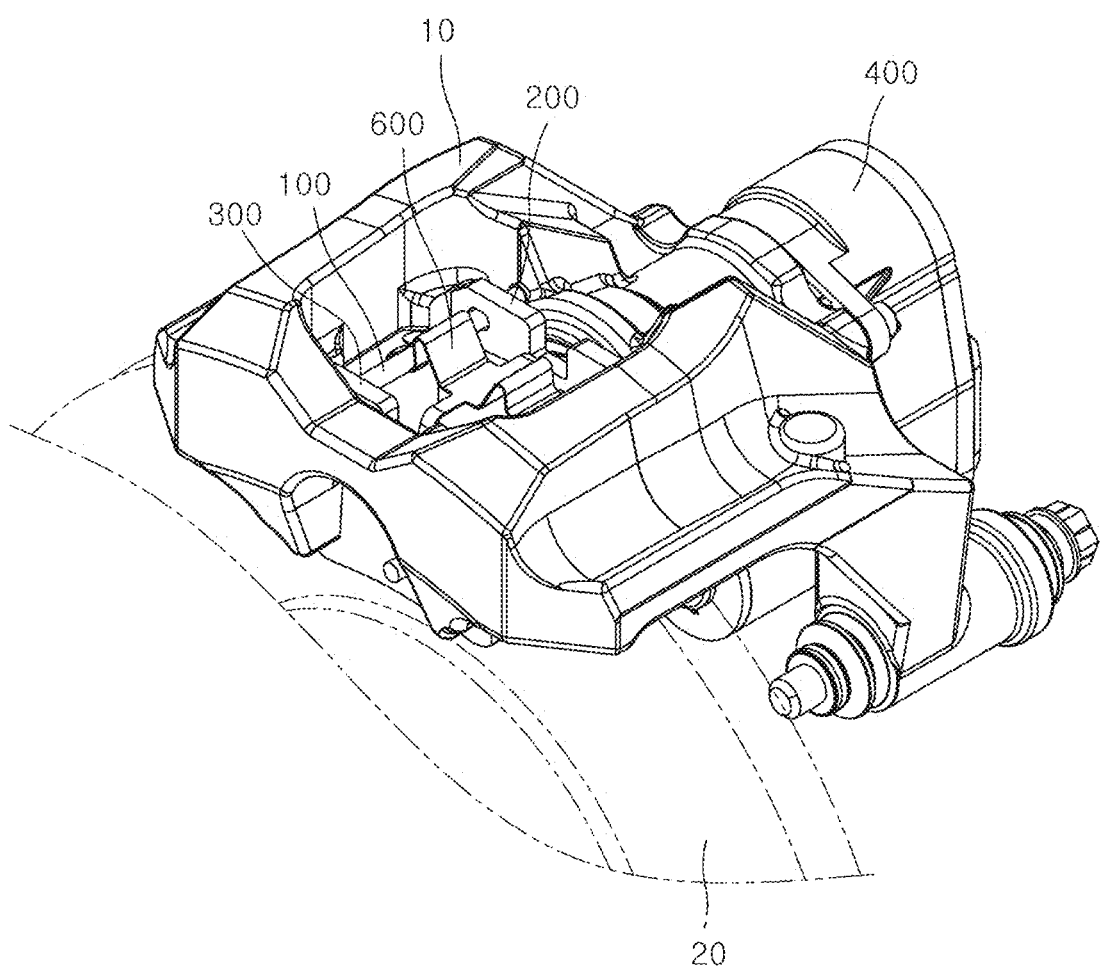
FIG. 11 is a diagram schematically illustrating a brake apparatus for a vehicle in accordance with a second embodiment of the present disclosure.
Figure 12:
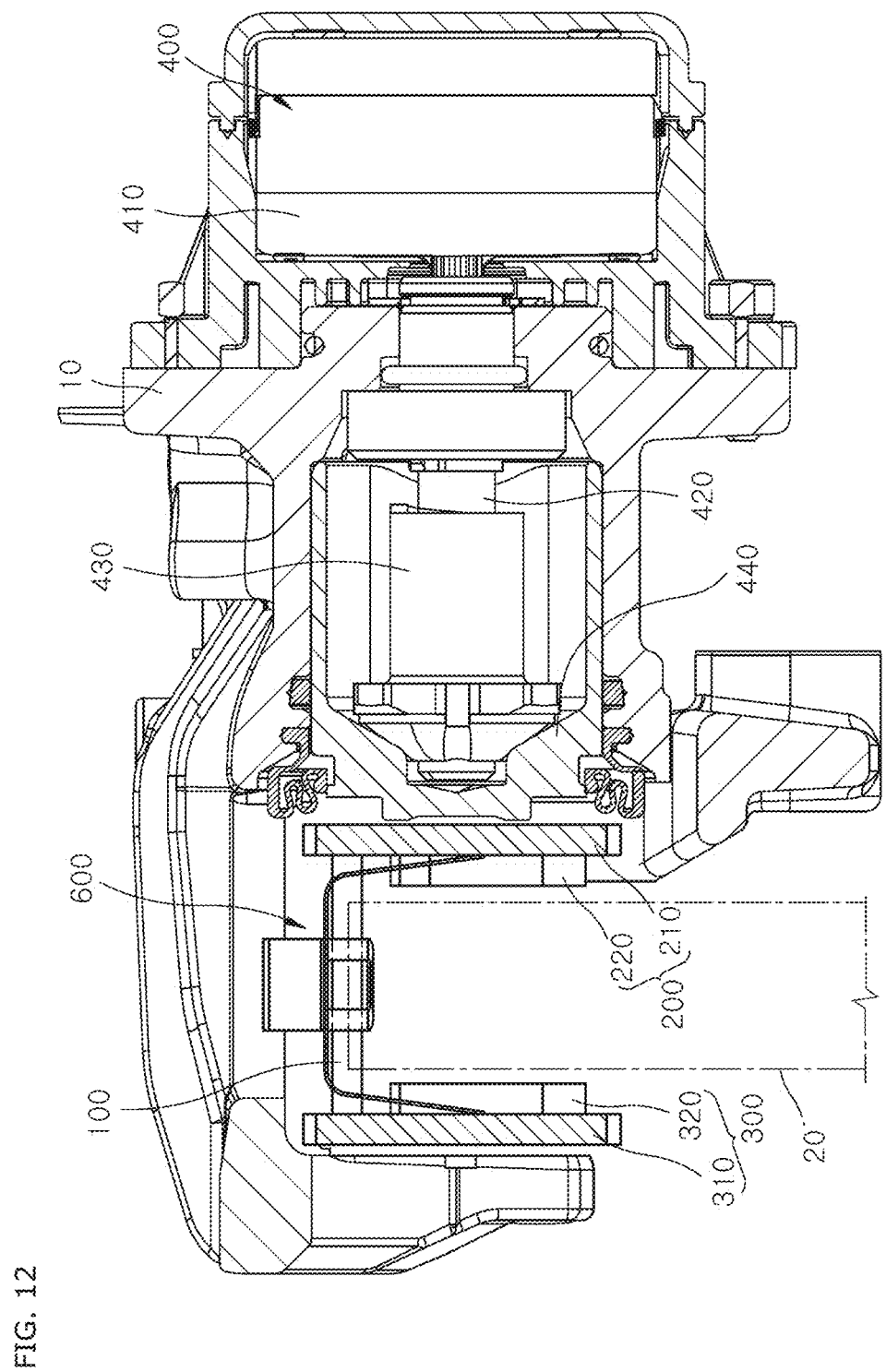
FIG. 12 is a cross-sectional view of the brake apparatus for a vehicle in accordance with the second embodiment of the present disclosure.
Figure 13:
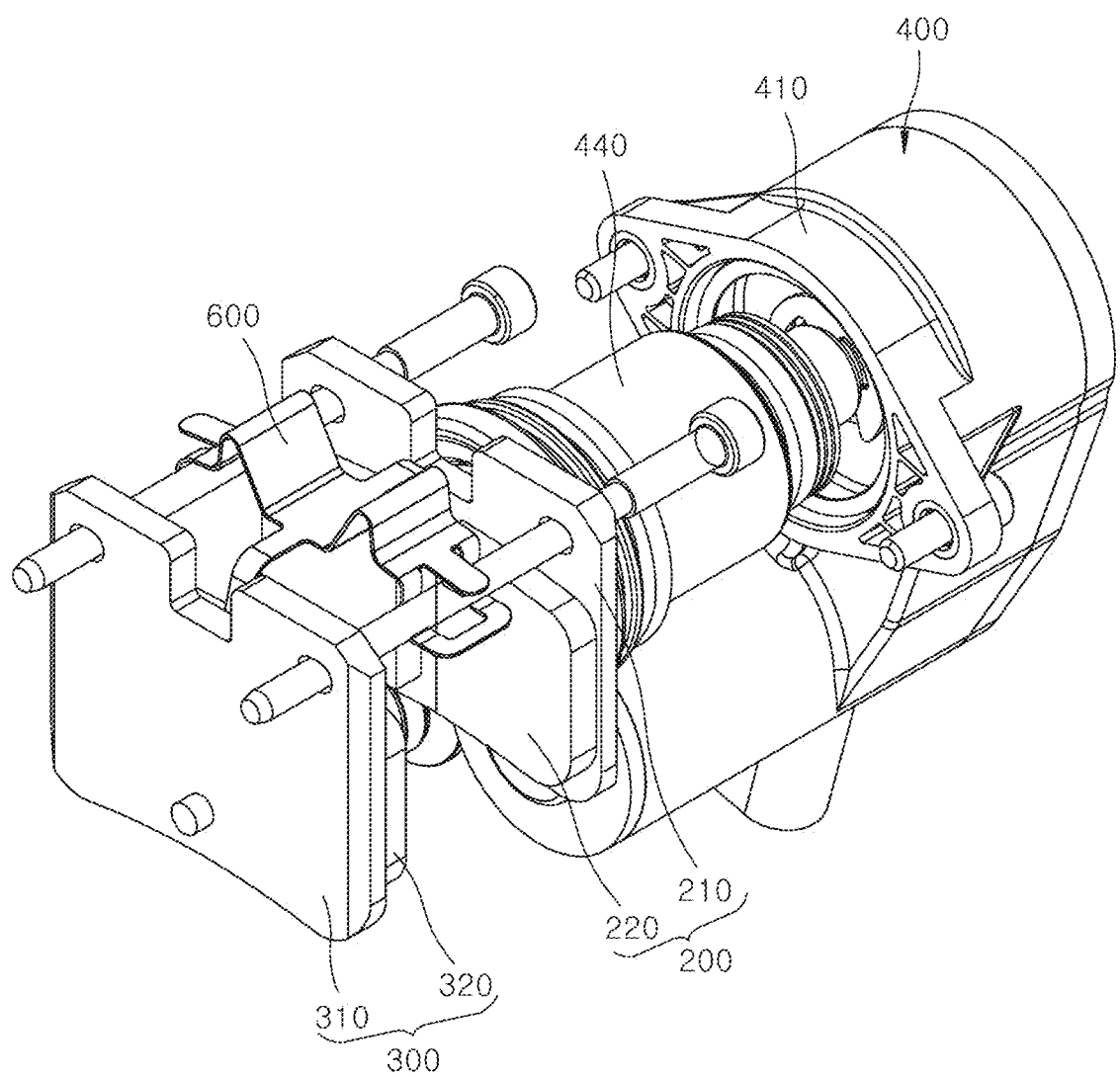
FIG. 13 is a perspective view of main parts of the brake apparatus for a vehicle in accordance with the second embodiment of the present disclosure.
Figure 14:
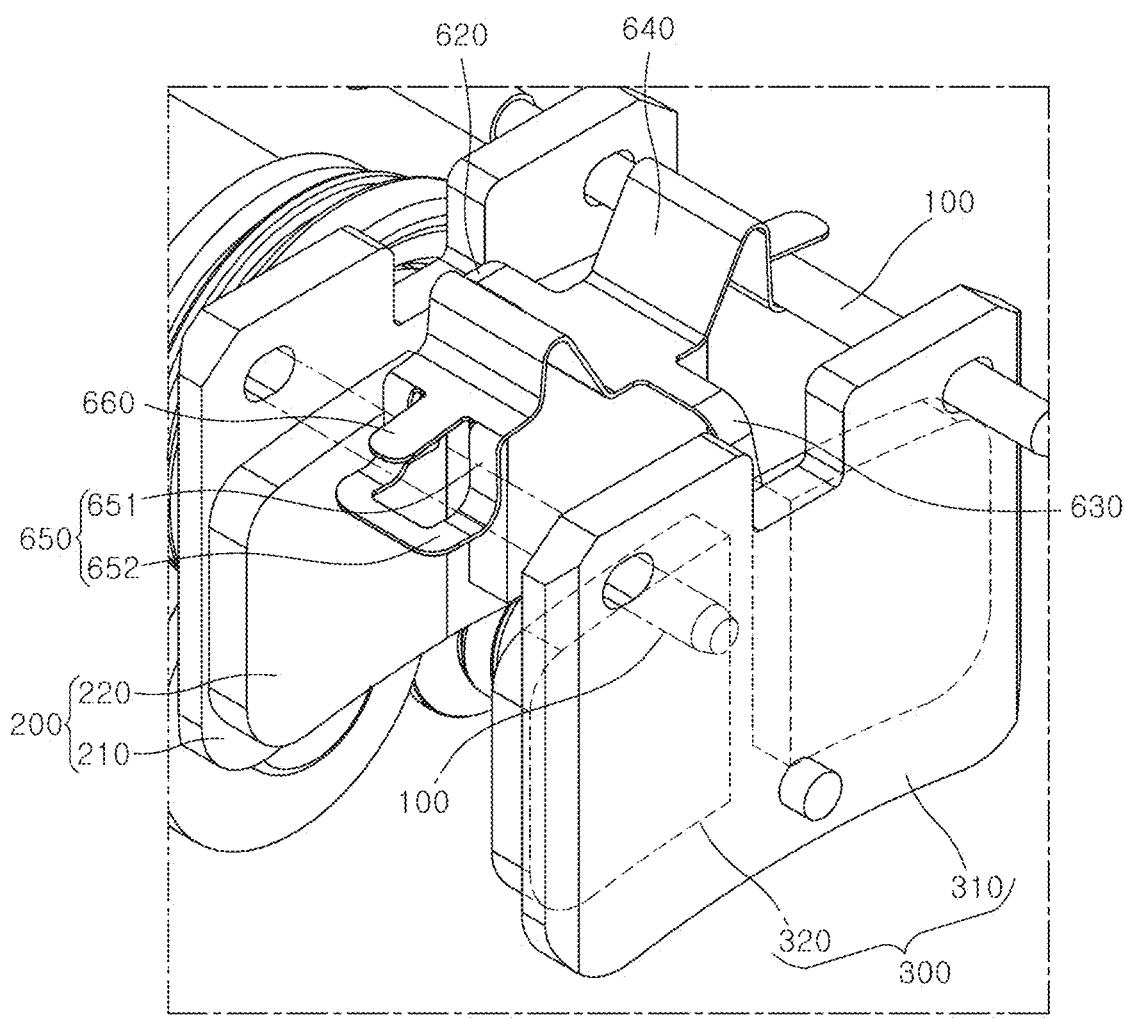
FIG. 14 is an expanded view of the main parts of FIG. 13.
Figure 15:
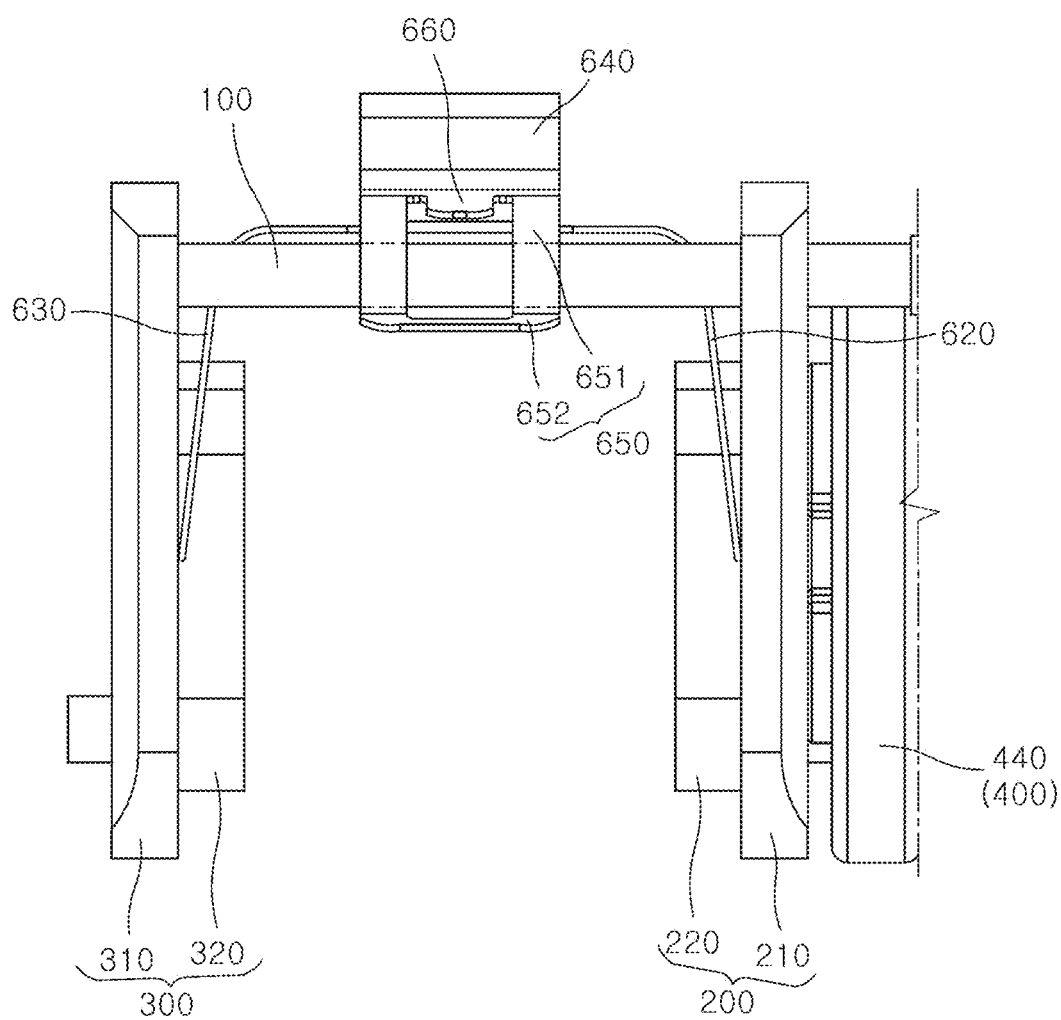
FIG. 15 is a cross-sectional view of the main parts of FIG. 13.
Figure 16:
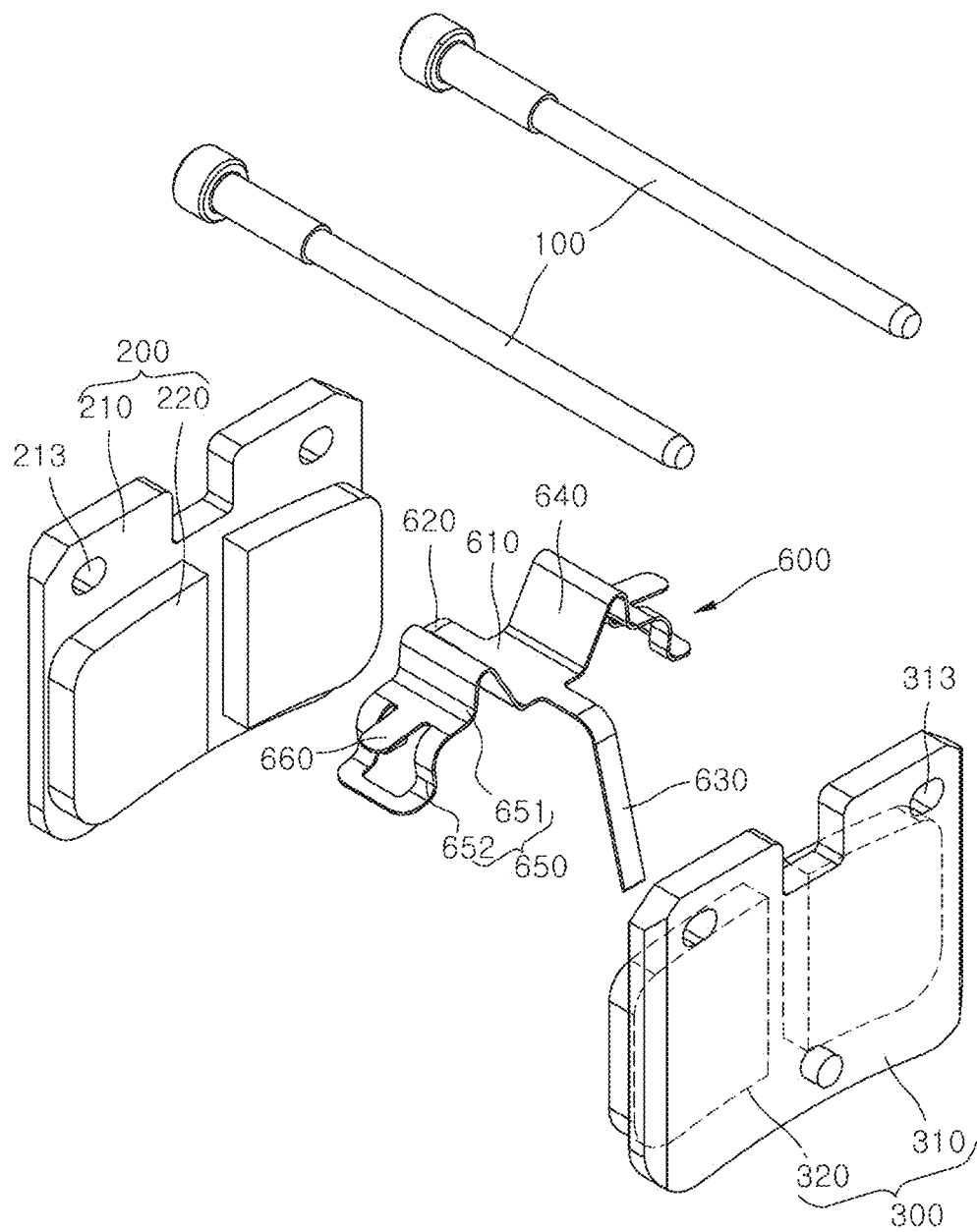
FIG. 16 is an exploded perspective view of the main parts of FIG. 13.
Figure 17:
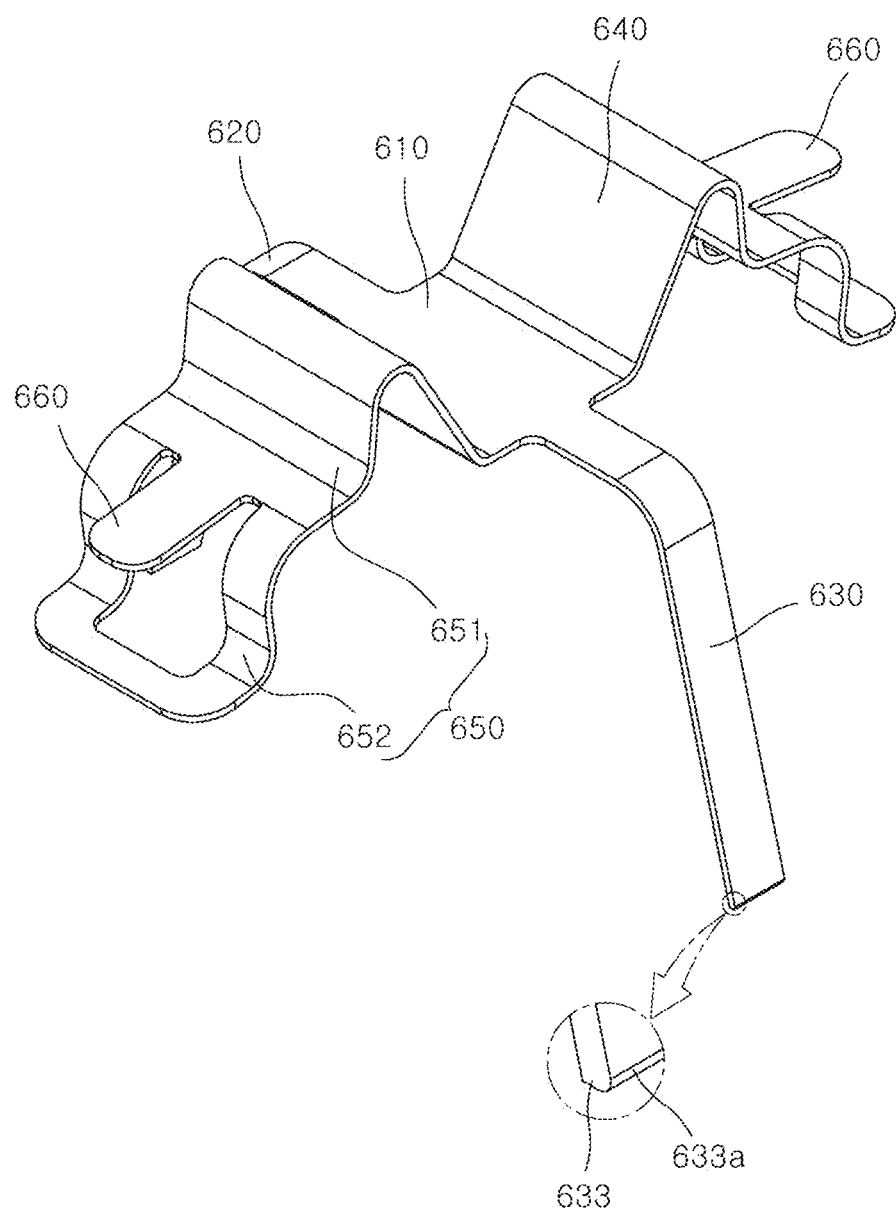
FIG. 17 is a perspective view of a pad liner of the brake apparatus for a vehicle in accordance with the second embodiment of the present disclosure.
Figure 18:
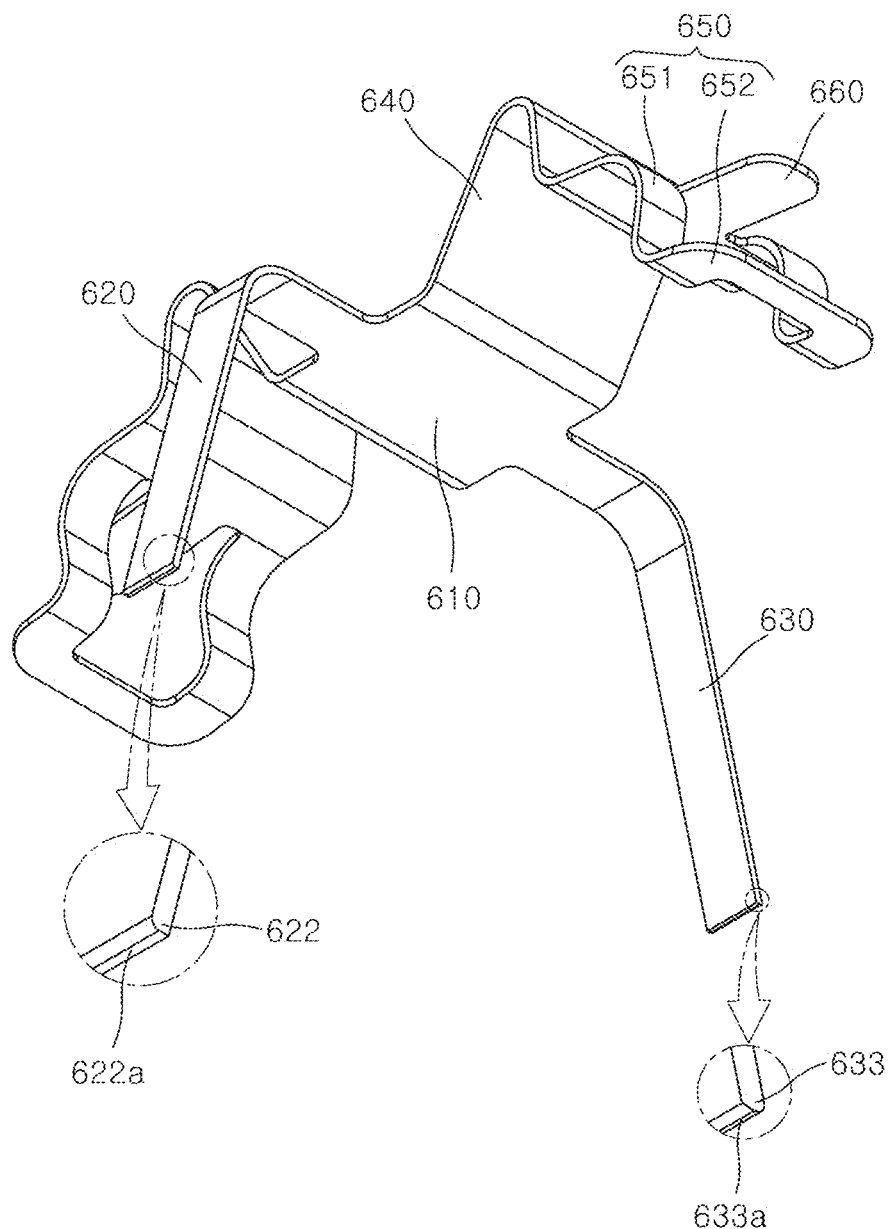
FIG. 18 is a perspective view of the pad liner of the brake apparatus for a vehicle in accordance with the second embodiment of the present disclosure, when seen from a different direction.
Figure 19:
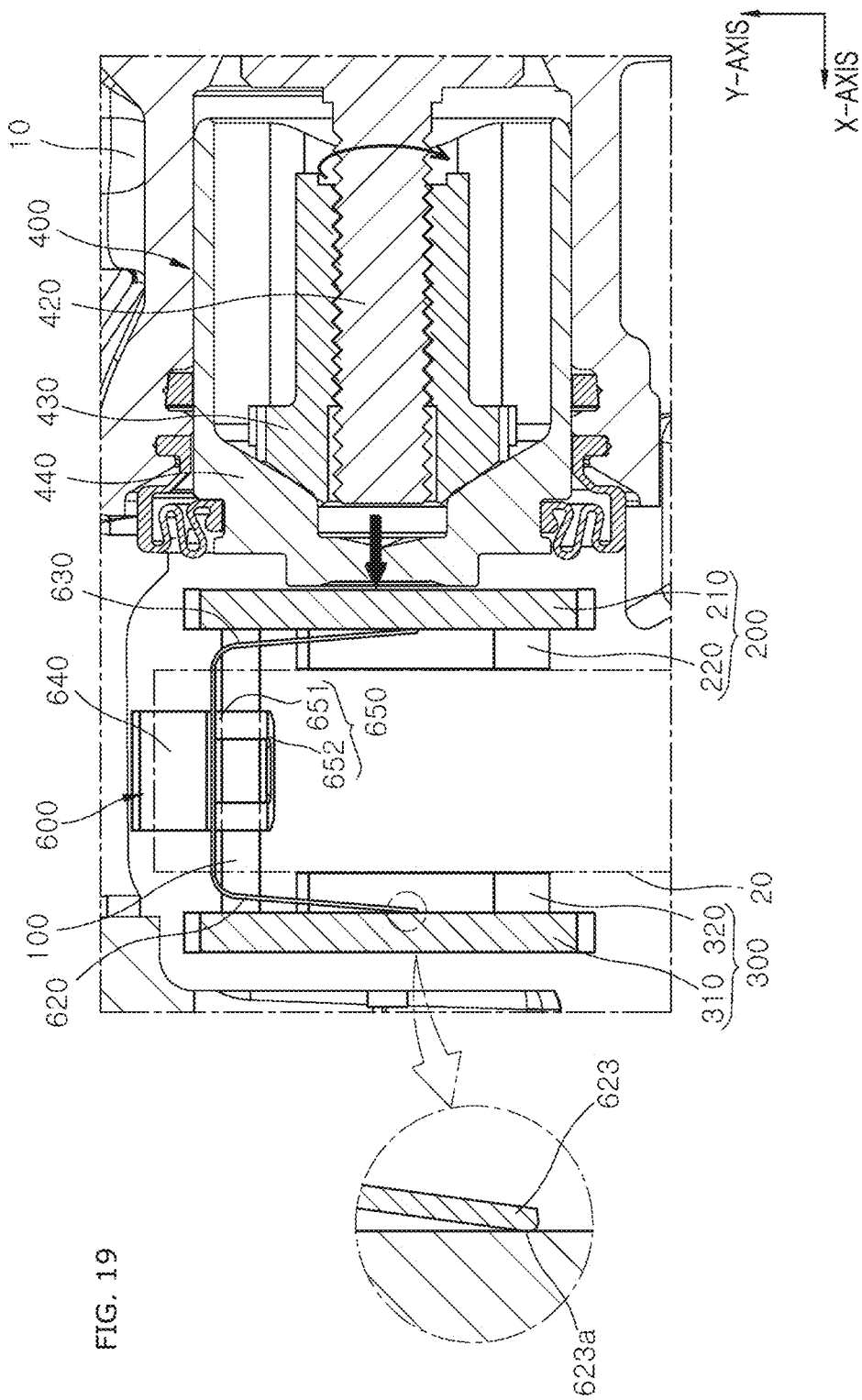
FIGS. 19 and 20 are diagrams illustrating an operation of the brake apparatus for a vehicle in accordance with the second embodiment of the present disclosure.
Figure 20:
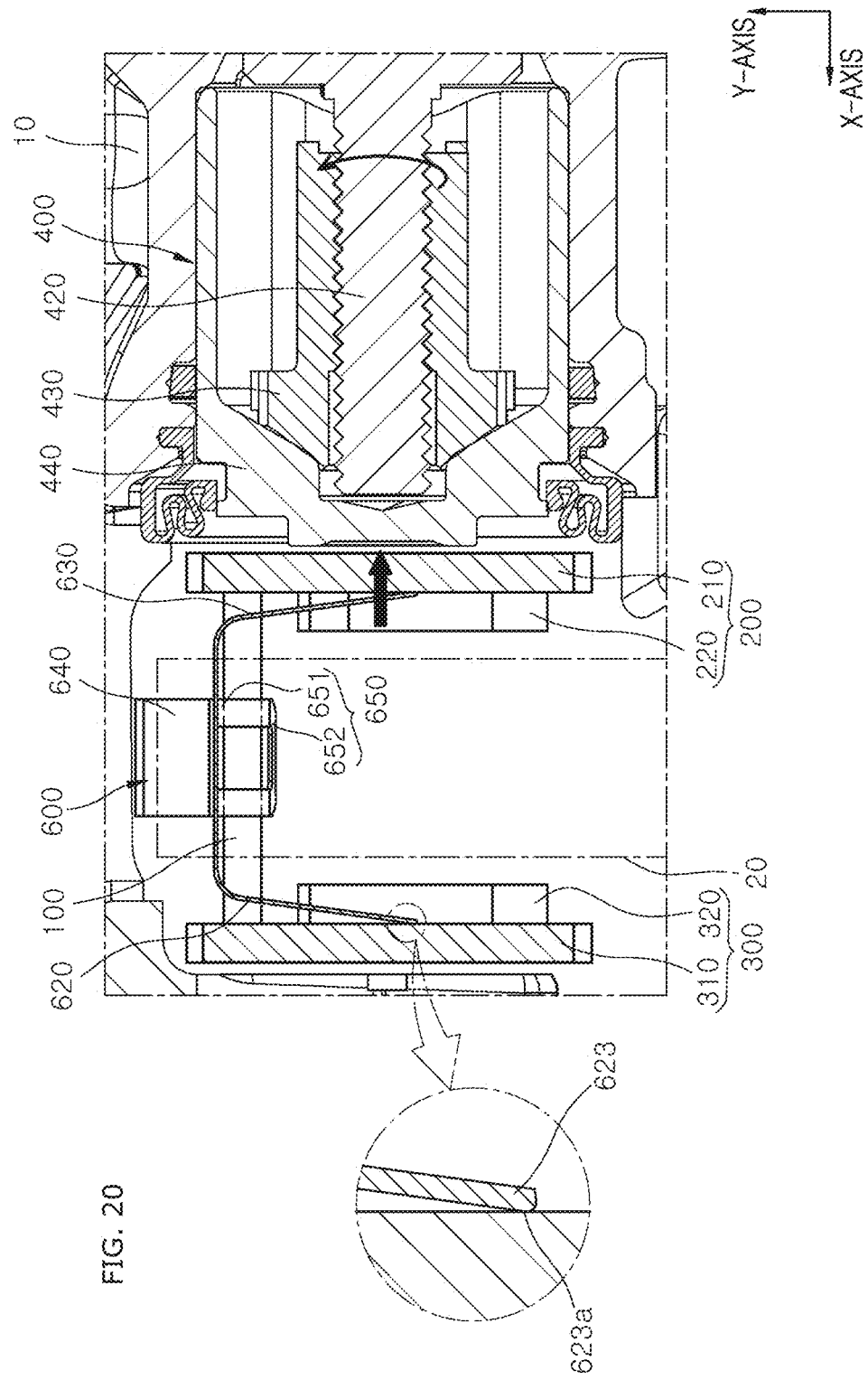

FIG. 11 is a diagram schematically illustrating a brake apparatus for a vehicle in accordance with a second embodiment of the present disclosure, FIG. 12 is a cross-sectional view of the brake apparatus for a vehicle in accordance with the second embodiment of the present disclosure, FIG. 13 is a perspective view of main parts of the brake apparatus for a vehicle in accordance with the second embodiment of the present disclosure, FIG. 14 is an expanded view of the main parts of FIG. 13, FIG. 15 is a cross-sectional view of the main parts of FIG. 13, FIG. 16 is an exploded perspective view of the main parts of FIG. 13, FIG. 17 is a perspective view of a pad liner of the brake apparatus for a vehicle in accordance with the second embodiment of the present disclosure, FIG. 18 is a perspective view of the pad liner of the brake apparatus for a vehicle in accordance with the second embodiment of the present disclosure, when seen from a different direction, and FIGS. 19 and 20 are diagrams illustrating an operation of the brake apparatus for a vehicle in accordance with the second embodiment of the present disclosure.

Hereafter, the brake apparatus for a vehicle in accordance with the second embodiment of the present disclosure will be described. At this time, the detailed descriptions of the same contents of the second embodiment as those of the first embodiment will be omitted herein.

Referring to FIGS. 11 to 20, a brake apparatus 2 for a vehicle in accordance with the second embodiment of the present disclosure includes a pad liner 600 which applies a load to a first brake pad 200 and a second brake pad 300. Even during a braking/releasing process, the pad liner 600 may apply a load by pressing the first and second brake pads 200 and 300 at a position when the pad liner 600 is assembled, i.e. a regular position. That is, during the braking/releasing process, it is possible to prevent rattle noise which may be generated while the pad liner 600 interferes with the first and second brake pads 200 and 300 due to vibration or the like.

The pad liner 600 includes a pad liner body 610, a first pad liner return part 620, a second pad liner return part 630, a pair of pad liner extension parts 640, a pair of pad liner support parts 650 and a pair of pad liner movement restriction parts 660.

The pad liner body 610 is disposed between a pair of pin members 100. The pad liner body 610 is disposed between the pair of pin members 100 so as to be parallel to the pin members 100.

The first pad liner return part 620 is extended from the pad liner body 610 so as to be tilted toward the first brake pad 200, and contacted with the first brake pad 200. The first pad liner return part 620 is elastically deformed by the first brake pad 200 which is moved toward a brake disk 20 through a pressing part 400 during the braking process, and provides an elastic restoring force to the first brake pad 200 during the releasing process.

The second pad liner return part 630 is extended from the pad liner body 610 so as to be tilted toward the second brake pad 300, and contacted with the second brake pad 300. The second pad liner return part 630 is elastically deformed between the first and second brake pads 200 and 300 during the braking process, and provides an elastic restoring force to the second brake pad 300 during the releasing process.

The pair of pad liner extension parts 640 are extended from one end of the pad liner body 610 to the opposite side of the first pad liner return part 620, and extended from the other end of the pad liner body 610 to the opposite side of the second pad liner return part 630.

The pair of pad liner support parts 650 are bent and extended from the pair of pad liner extension parts 640 toward the pair of pin members 100, respectively, and supports the pair of pin members 100, respectively. The pair of pad liner support parts 650 are positioned at the bottoms (based on FIGS. 13 to 15) of the pair of pin members 100, respectively, and support the pin members 100, respectively. The pad liner 600 may be restricted from moving downward on the pair of pin members 100, which makes it possible to effectively prevent rattle noise.

The pair of pad liner movement restriction parts 660 protrude from the pair of pad liner extension parts 640 toward the pair of pin members 100, respectively, and are disposed to face the pair of pin members 100, respectively. Specifically, the pair of pad liner movement restriction parts 660 protrude from the pair of pad liner support parts 650 toward the pair of pin members 100, respectively, and are positioned over the pair of pin members 100 (based on FIGS. 13 to 15). The pad liner 600 may be restricted from moving upward on the pair of pin members 100, which makes it possible to effectively prevent rattle noise.

The first brake pad 200 includes a first back plate 210 and a pair of first friction members 220. The first back plate 210 is movably coupled to the pair of pin members 100, and disposed on one side of the brake disk 20 so as to be contactable with the pressing part 400.

The pair of first friction members 220 are coupled to the first back plate 210 so as to be spaced part from each other, and contacted with the brake disk 20. The first back plate 210 has a first space 212 formed between the pair of first friction members 220 and contacted with the first pad liner return part 620.

The second brake pad 300 includes a second back plate 310 and a pair of second friction members 320. The second back plate 310 is coupled to the pair of pin members 100, and disposed on the other side of the brake disk 20.

The pair of second friction members 320 are coupled to the second back plate 310 so as to be spaced part from each other, and contacted with the brake disk 20. The second back plate 310 has a second space 312 formed between the pair of second friction members 320 and contacted with the second pad liner return part 630.

The first pad liner return part 620 has a rounded portion 620a contacted with the first space 212, and the second pad liner return part 630 has a rounded portion 630a contacted with the second space 312. Thus, it is possible to reduce not only damage to the first brake pad 200 due to the contact between the first pad liner return part 620 and the first brake pad 200, but also damage to the second brake pad 300 due to the contact between the second pad liner return part 630 and the second brake pad 300.

When a screw bar 420 is rotated in a predetermined direction, a nut 430, a piston 440 and the first brake pad 200 may be moved toward the brake disk 20 at the same time, and the first and second brake pads 200 and 300 may be brought into contact with the brake disk 20 to generate a braking force. At this time, the pad liner 600 is disposed between the first and second brake pads 200 and 300, and elastically deformed.

Then, when the screw bar 420 is rotated in the opposite direction of the predetermined direction, the nut 430, the piston 440 and the first brake pad 200 may be moved to the opposite side of the brake disk 20, and the first and second brake pads 200 and 300 may be spaced apart from the brake disk 20 such that the braking force is removed. At this time, the pad liner 600 may provide an elastic restoring force to the first and second brake pads 200 and 300, such that the first and second brake pads 200 and 300 are perfectly spaced apart from the brake disk 20. Thus, it is possible to prevent the generation of drag torque (see FIGS. 19 and 20). Furthermore, the pad liner 600 may be restricted from moving in the top-to-bottom direction, which makes it possible to prevent the generation of rattle noise.

Figure 21:
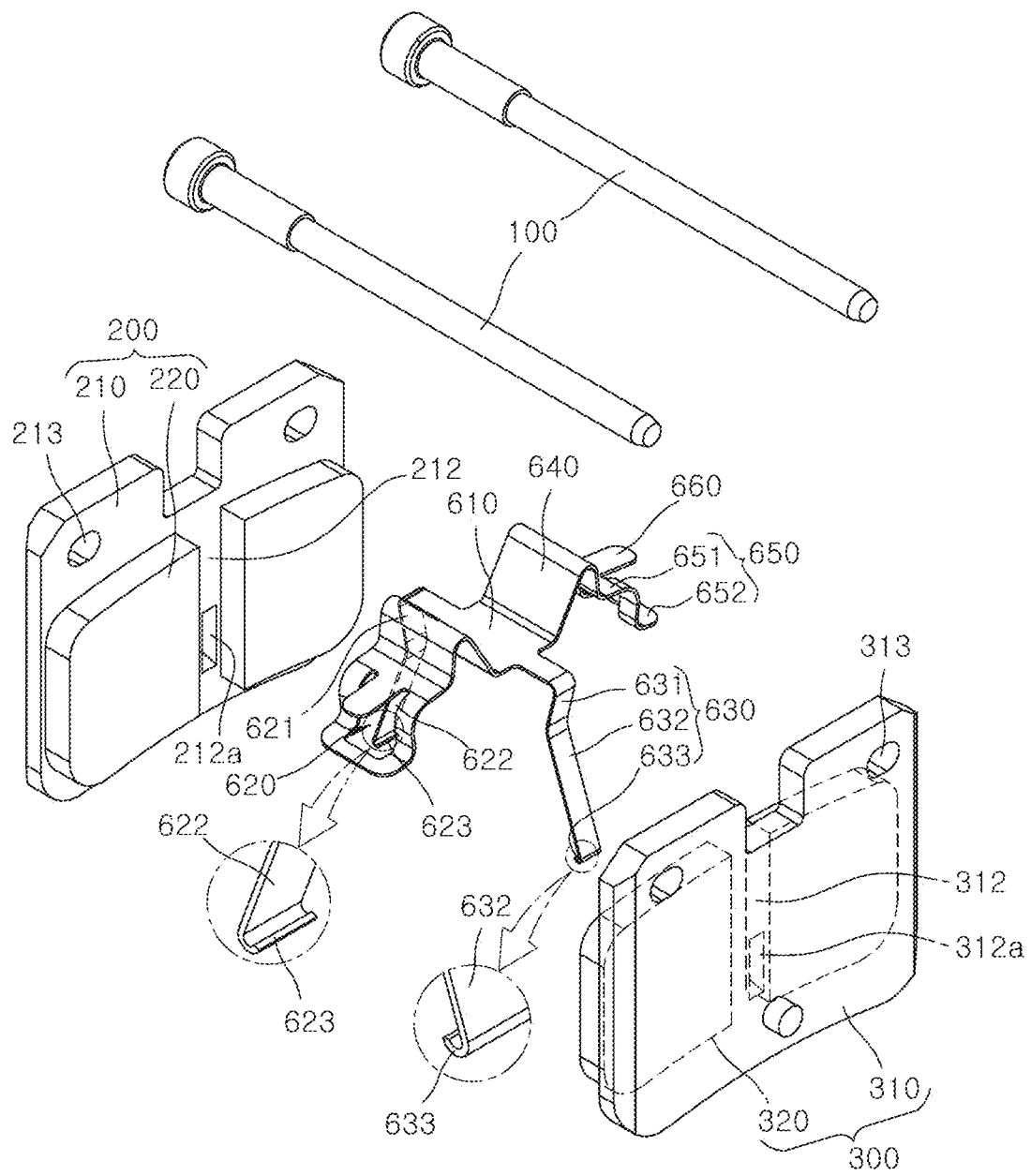
FIG. 21 is an exploded perspective view of main parts of a brake apparatus for a vehicle in accordance with a third embodiment of the present disclosure.
Figure 22:
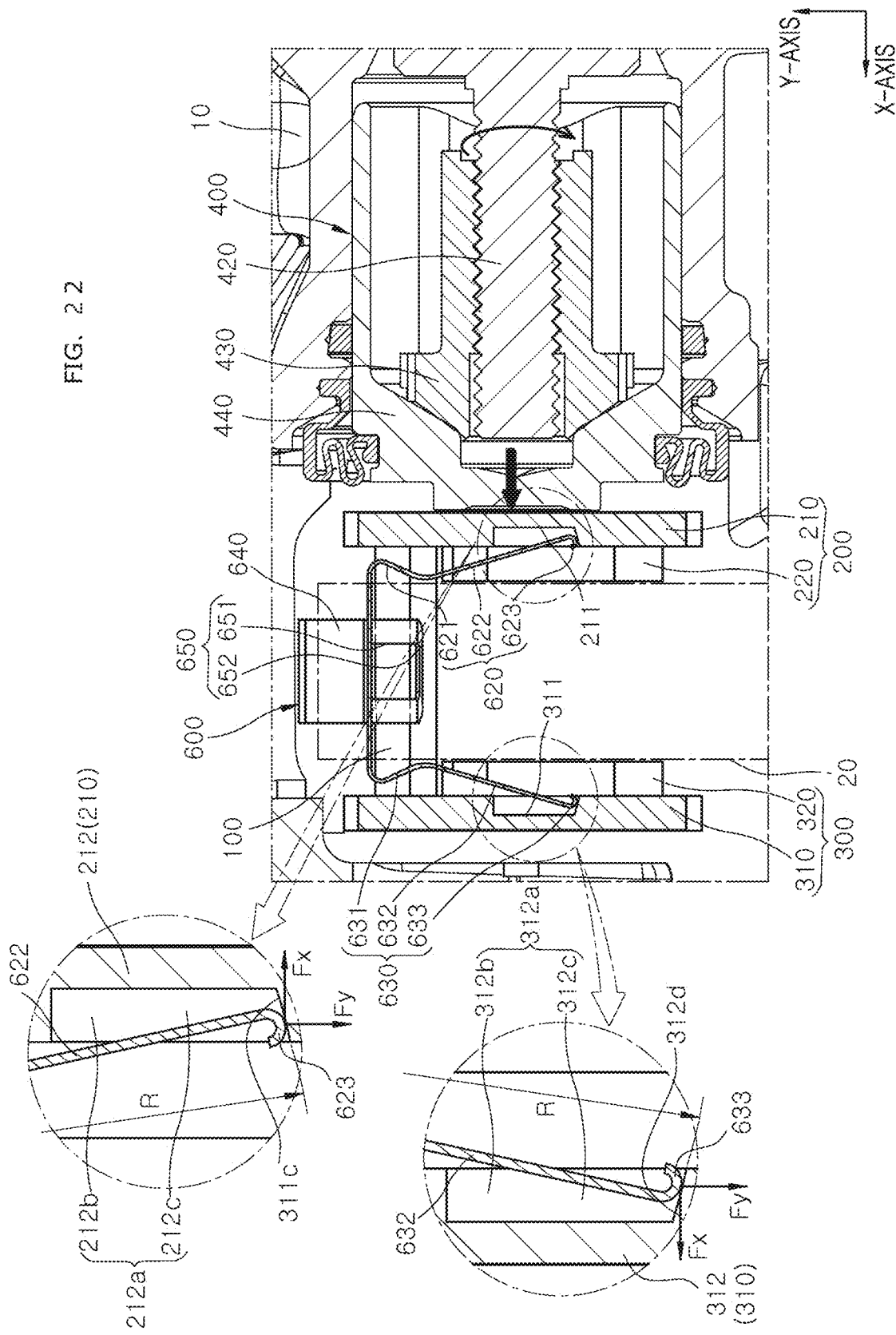
FIGS. 22 and 23 are cross-sectional views of of the brake apparatus for a vehicle in accordance with the third embodiment of the present disclosure.
Figure 23:
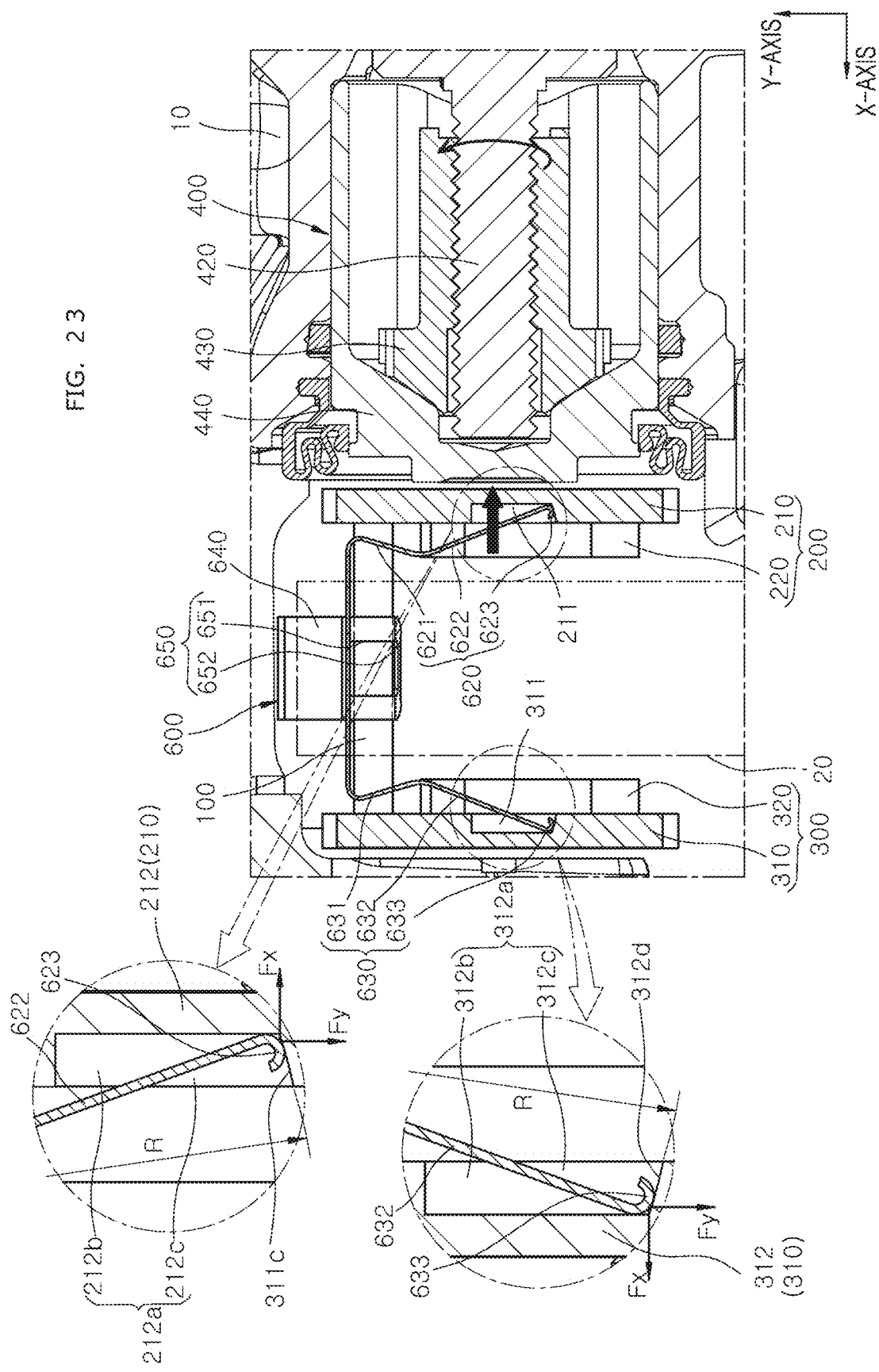

FIG. 21 is an exploded perspective view of main parts of a brake apparatus for a vehicle in accordance with a third embodiment of the present disclosure, and FIGS. 22 and 23 are cross-sectional views of the main parts of the brake apparatus for a vehicle in accordance with the third embodiment of the present disclosure.

Hereafter, the brake apparatus for a vehicle in accordance with the third embodiment of the present disclosure will be described. At this time, the detailed descriptions of the same contents of the third embodiment as those of the first and second embodiments will be omitted herein.

Referring to FIGS. 21 to 23, a first pad liner return part 620 in accordance with the third embodiment of the present disclosure includes a first pad liner return extension part body 621 and a first pad liner return contact part 622. The first pad liner return extension part body 621 is extended from a pad liner body 610 so as to be tilted toward a first brake pad 200.

The first pad liner return contact part 622 is extended from the first pad liner return extension part body 621 and tilted toward the first brake pad 200 so as to form a predetermined angle with the first pad liner return extension part body 621, and contacted with a first space 212. Thus, it is possible to prevent plastic deformation in the first pad liner return part 620, when the first pad liner return part 620 is elastically deformed during the braking process.

A second pad liner return part 630 includes a second pad liner return extension part body 631 and a second pad liner return contact part 632. The second pad liner return extension part body 631 is extended and tilted from the pad liner body 610 toward a second brake pad 300.

The second pad liner return contact part 632 is extended from the second pad liner return extension part body 631 and tilted toward the second brake pad 300 so as to form a predetermined angle with the second brake pad 300, and contacted with a second space 312. Thus, it is possible to prevent plastic deformation in the second pad liner return part 630, when the second pad liner return part 630 is elastically deformed during the braking process.

The first pad liner return contact part 622 includes a first contact part 622a. The first contact part 622a is formed by bending an end portion of the first pad liner return contact part 622 in a direction facing the second pad liner return contact part 632, and thus has a round portion contacted with the first brake pad 200. Therefore, it is possible to reduce damage to the first brake pad 200 due to the contact between the first pad liner return contact part 622 and the first brake pad 200.

The second pad liner return contact part 632 includes a second contact part 632a. The second contact part 632a is formed by bending an end portion of the second pad liner return contact part 632 in a direction facing the first pad liner return contact part 622, and thus has a round portion contacted with the second brake pad 300. Therefore, it is possible to reduce damage to the second brake pad 300 due to the contact between the second pad liner return contact part 632 and the second brake pad 300.

The first space 212 has a first groove part 212a formed therein, such that the first pad liner return part 620 is inserted into the first groove part 212a so as to be contacted with the first groove part 212a. Specifically, the first pad liner return contact part 622 of the first pad liner return part 620 is inserted into the first groove part 212a so as to be contacted with the first groove part 212a.

The second space 312 has a second groove part 312a formed therein, such that the second pad liner return part 630 is inserted into the second groove part 312a so as to be contacted with the second groove part 312a. Specifically, the second pad liner return contact part 632 of the second pad liner return part 630 is inserted into the second groove part 312a so as to be contacted with the second groove part 312a.

The first groove part 212a has a first contact groove 212c which is contacted with the first pad liner return part 620, and formed in a tilted shape whose width increases from the inside to the outside. Specifically, the first groove part 212a includes a first groove body 212b and the first contact groove 212c. The first groove body 212b, into which the first pad liner return contact part 622 is inserted, has a constant width. The first contact groove 212c is connected to the first groove body 212b, formed in a shape whose width increases toward the outside, and contacted with the first pad liner return contact part 622. The first contact groove 212c has a first contact surface 212d which is contacted with the first pad liner return contact part 622 and tilted from top to bottom (based on FIGS. 22 and 23).

Thus, during a braking/releasing process, the first pad liner return part 620 may be easily moved toward a brake disk 20 or to the opposite side of the brake disk 20, while pressing the first contact surface 212d and forming a curve along the first contact surface 212d. Furthermore, during the braking/release process, a force R may be applied in a direction Fx and a direction Fy in the first groove part 212a by the first pad liner return part 620, and the magnitude of the force applied in the direction Fy may be constantly maintained. Thus, it is possible to further prevent the generation of rattle noise due to the interference between the first pad liner return part 620 and the first brake pad 200.

The second groove part 312a has a second contact groove 312c which is contacted with the second pad liner return part 630, and formed in a tilted shape whose width increases from the inside to the outside. Specifically, the second groove part 312a includes a second groove body 312b and the second contact groove 312c. The second groove body 312b, into which the second pad liner return contact part 632 is inserted, has a constant width. The second contact groove 312c is connected to the second groove body 312b, formed in a shape whose width increases toward the outside, and contacted with the second pad liner return contact part 632. The second contact groove 312c has a second contact surface 312d which is contacted with the second pad liner return contact part 632 and tilted from top to bottom (based on FIGS. 22 and 23).

Thus, during the braking/releasing process, the second pad liner return part 630 may be easily moved toward the brake disk 20 or to the opposite side of the brake disk 20, while pressing the second contact surface 312d and forming a curve along the second contact surface 312d. Furthermore, during the braking/release process, a force R may be applied in a direction Fx and a direction Fy in the second groove part 312a by the second pad liner return part 630, and the magnitude of the force applied in the direction Fy may be constantly maintained. Thus, it is possible to further prevent the generation of rattle noise due to interference between the second pad liner return part 630 and the second brake pad 300 (see FIGS. 22 and 23).

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A brake apparatus for a vehicle, comprising:
    a pair of pin members installed in a caliper body so as to be spaced apart from each other;
    a first brake pad movably coupled to the pair of pin members, and contactable with a brake disk;
    a second brake pad coupled to the pair of pin members so as to be spaced apart from the first brake pad, and contactable with the brake disk;
    a pressing part installed in the caliper body, and configured to press the first brake pad to bring the first and second brake pads into contact with the brake disk; and
    a pad liner installed between the first brake pad and the second brake pad and configured to provide an elastic restoring force to the first and second brake pads such that the first and second brake pads are restored to the original state when the pressing of the pressing part is released, and applies a load to the first and second brake pads,
    wherein the pad liner includes a pair of pad liner support parts protruding from both ends of a pad liner body, respectively, and placed under the pair of pin members, and a pair of pad liner mounting parts bent and extended from the both ends of the pad liner body and configured to cover the pair of pin members supported by the pair of pad liner support parts such that the pad liner is provided to accommodate the pair of pin members between the pair of pad liner support parts and the pair of pad liner mounting parts.

2. The brake apparatus of claim 1, wherein the pad liner comprises:
    the pad liner body disposed between the pair of pin members;
    a pair of pad liner extension parts extended from the pad liner body to the opposite side of the pad liner body the pair of pad liner mounting parts; and
    a pair of pad liner return parts connected to the pair of pad liner extension parts, respectively, and contacted with the first and second brake pads so as to provide an elastic restoring force to the first and second brake pads, respectively.

3. The brake apparatus of claim 2, wherein each of the pair of pad liner return parts comprises:
    a pad liner return part body connected to the pad liner extension part;
    a first pad liner return extension part extended from the pad liner return part body so as to be tilted toward the first brake pad, and contacted with the first brake pad; and
    a second pad liner return extension part extended from the pad liner return part body so as to be tilted toward the second brake pad, and contacted with the second brake pad.

4. The brake apparatus of claim 3, wherein the first pad liner return extension part comprises:

a first pad liner return extension part body extended from the pad liner return part body so as to be tilted toward the first brake pad; and a first pad liner return contact part extended from the first pad liner return extension part body and tilted toward the first brake pad so as to form a predetermined angle with the first pad liner return extension part body, and contacted with the first brake pad.

5. The brake apparatus of claim 4, wherein the second pad liner return extension part comprises:

a second pad liner return extension part body extended from the pad liner return part body so as to be tilted toward the second brake pad; and a second pad liner return contact part extended from the second pad liner return extension part body and tilted toward the second brake pad so as to form a predetermined angle with the second pad liner return extension part body, and contacted with the second brake pad.

6. The brake apparatus of claim 5, wherein the first pad liner return contact part comprises a first contact part which is formed by bending an end portion of the first pad liner return contact part in a direction facing the second pad liner return contact part, and has a portion, which is rounded or bent, contacted with the first brake pad, and the second pad liner return contact part comprises a second contact part which is formed by bending an end portion of the second pad liner return contact part in a direction facing the first pad liner return contact part, and has a portion, which is rounded or bent, contacted with the second brake pad.

7. The brake apparatus of claim 3, wherein the first brake pad has a plurality of first groove parts formed therein, such that the first pad liner return extension part is inserted into the corresponding first groove part and contacted with the first groove part, and the second brake pad has a plurality of second groove parts formed therein, such that the second pad liner return extension part is inserted into the corresponding second groove part and contacted with the second groove part.

8. The brake apparatus of claim 7, wherein the first groove part comprises a first contact groove which is contacted with the first pad liner return extension part, and formed in a tilted shape, and the second groove part comprises a second contact groove which is contacted with the second pad liner return extension part, and formed in the tilted shape.

9. The brake apparatus of claim 1, wherein the pad liner comprises: the pad liner body disposed between the pair of pin members;

a first pad liner return part extended from the pad liner body so as to be tilted toward the first brake pad, and contacted with the first brake pad;

a second pad liner return part extended from the pad liner body so as to be tilted toward the second brake pad, and contacted with the second brake pad;

a pair of pad liner extension parts extended from one end of the pad liner body to the opposite side of the first pad liner return part, and extended from the other end of the pad liner body to the opposite side of the second pad liner return part;

and a pair of pad liner protrusion parts protruding from the pair of pad liner extension parts toward the pair of pin members, respectively, and disposed to face the pair of pin members, respectively.

10. The brake apparatus of claim 9, wherein the first brake pad comprises: a first back plate movably coupled to the pair of pin members, and disposed on one side of the brake disk, such that the pressing part is contactable with the first back plate; and a pair of first friction members coupled to the first back plate so as to be spaced apart from each other, and contacted with the brake disk, wherein the first back plate has a first space formed between the pair of first friction members, such that the first pad liner return part is contacted with the first space.

11. The brake apparatus of claim 10, wherein the first pad liner return part comprises: a first pad liner return extension part body extended from the pad liner body so as to be tilted toward the first brake pad; and a first pad liner return contact part extended from the first pad liner return extension part body and tilted toward the first brake pad so as to form a predetermined angle with the first pad liner return extension part body, and contacted with the first space.

12. The brake apparatus of claim 11, wherein the second brake pad comprises: a second back plate coupled to the pair of pin members so as to be spaced apart from the first brake pad, and disposed on the other side of the brake disk; and a pair of second friction members coupled to the second back plate so as to be spaced apart from each other, and contacted with the brake disk, wherein the second back plate has a second space formed between the pair of second friction members, such that the second pad liner return part is contacted with the second space.

13. The brake apparatus of claim 12, wherein the second pad liner return part comprises: a second pad liner return extension part body extended from the pad liner body so as to be tilted toward the second brake pad; and a second pad liner return contact part extended from the second pad liner return extension part body and tilted toward the second brake pad so as to form a predetermined angle with the second brake pad, and contacted with the second space.

14. The brake apparatus of claim 13, wherein the first pad liner return contact part comprises a first contact part which is formed by bending an end portion of the first pad liner return contact part in a direction facing the second pad liner return contact part, and has a round portion contacted with the first brake pad, and the second pad liner return contact part comprises a second contact part which is formed by bending an end portion of the second pad liner return contact part in a direction facing the first pad liner return contact part, and has a round portion contacted with the second brake pad.

15. The brake apparatus of claim 12, wherein the first pad liner return part has a rounded portion contacted with the first space, and the second pad liner return part has a rounded portion contacted with the second space part.

16. The brake apparatus of claim 12, wherein the first space has a first groove part formed therein, such that the first pad liner return part is inserted into the first groove part, and contacted with the first groove part, and the second space has a second groove part formed therein, such that the second pad liner return part is inserted into the second groove part, and contacted with the second groove part.

17. The brake apparatus of claim 16, wherein the first groove part comprises a first contact groove which is contacted with the first pad liner return part, and formed in a tilted shape whose width increases from the inside to the outside, and the second groove part comprises a second contact groove which is contacted with the second pad liner return part, and formed in a tilted shape whose width increases from the inside to the outside.

* * * * *